US007855937B2

(12) United States Patent
Shimazawa et al.

(10) Patent No.: US 7,855,937 B2
(45) Date of Patent: Dec. 21, 2010

(54) NEAR-FIELD LIGHT GENERATING ELEMENT AND HEAT-ASSISTED MAGNETIC RECORDING HEAD UTILIZING SURFACE PLASMON MODE

(75) Inventors: Koji Shimazawa, Tokyo (JP); Eiji Komura, Tokyo (JP); Yasuhiro Ito, Tokyo (JP); Seiichi Takayama, Tokyo (JP); Satoshi Tomikawa, Tokyo (JP); Daisuke Miyauchi, Tokyo (JP); Kosuke Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 155 days.

(21) Appl. No.: 12/205,484

(22) Filed: Sep. 5, 2008

(65) Prior Publication Data

US 2010/0061200 A1 Mar. 11, 2010

(51) Int. Cl.
G11B 11/00 (2006.01)
(52) U.S. Cl. .................................... 369/13.33
(58) Field of Classification Search .............. 369/13.33, 369/13.12, 13.32, 13.13; 360/59
See application file for complete search history.

(56) References Cited

U.S. PATENT DOCUMENTS

| 6,768,556 | B1 | 7/2004 | Matsumoto et al. |
| 2003/0066944 | A1 | 4/2003 | Matsumoto et al. |
| 2004/0081031 | A1 | 4/2004 | Saga et al. |
| 2005/0249451 | A1* | 11/2005 | Baehr-Jones et al. ........... 385/14 |
| 2010/0079895 | A1* | 4/2010 | Takayama et al. .............. 360/59 |
| 2010/0103553 | A1* | 4/2010 | Shimazawa et al. ............ 360/59 |

FOREIGN PATENT DOCUMENTS

| JP | 2005-004901 | 1/2005 |
| JP | 2007-164935 | 6/2007 |
| JP | 2008-111845 | 5/2008 |

OTHER PUBLICATIONS

Michael Hochberg, Tom Baehr-Jones, Chris Walker & Axel Scherer, "Integrated plasmon and dielectric waveguides", Optics Express vol. 12, No. 22, pp. 5481 to 5486, 2004.

* cited by examiner

Primary Examiner—Ali Neyzari
(74) Attorney, Agent, or Firm—Frommer Lawrence & Haug LLP

(57) ABSTRACT

Provided is a near-field light generating element capable of avoiding excessive temperature rise, which comprises a waveguide and a near-field light generating layer. The layer comprises: a propagation surface on which surface plasmon excited by the light propagates; and a near-field light generating end at which near-field light is generated. The end is one end of the propagation surface. And a portion of the side surface of the waveguide is opposed to a portion of the propagation surface of the near-field light generating layer with a predetermined spacing so that the light propagating through the waveguide is coupled with the near-field light generating layer in a surface plasmon mode. The near-field light generating layer is preferably tapered toward the near-field light generating end.

32 Claims, 15 Drawing Sheets

Fig. 7a1
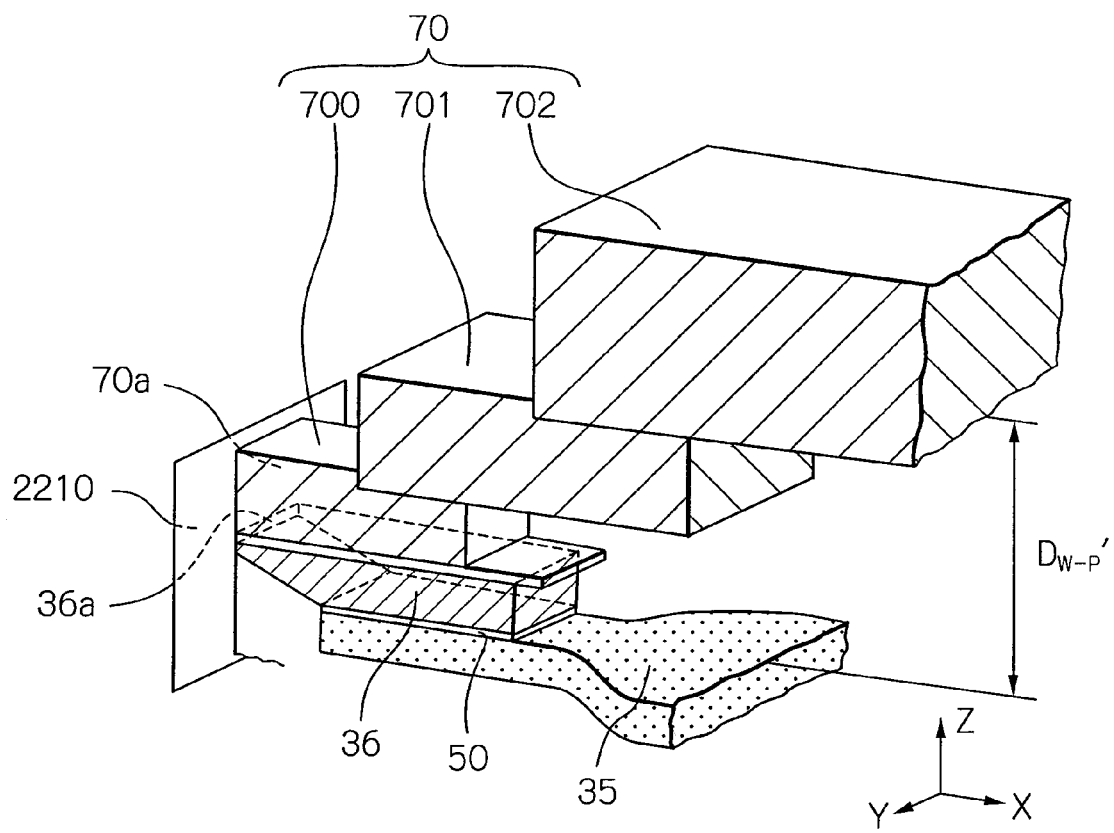
Fig. 7a2
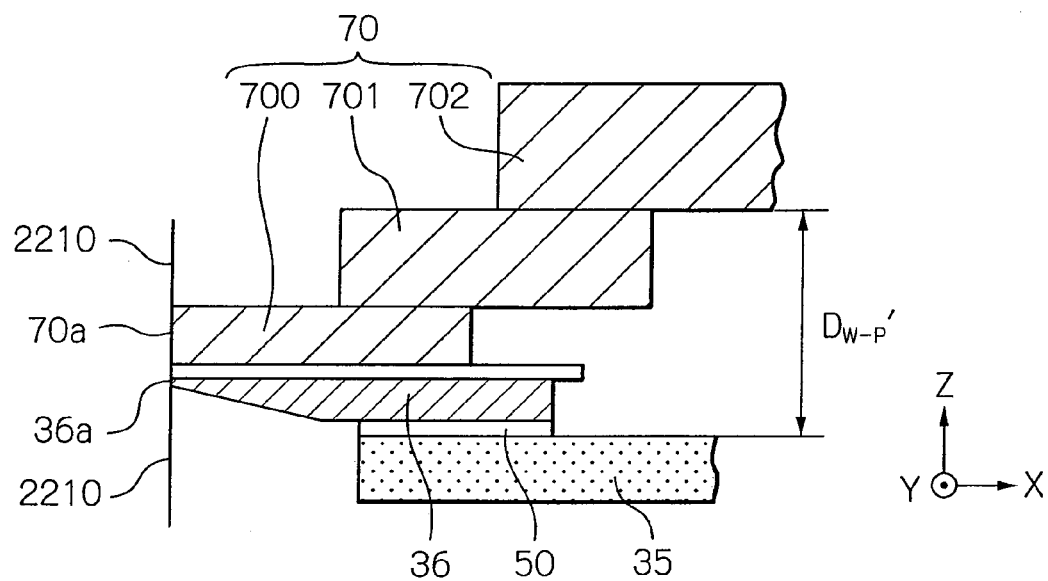

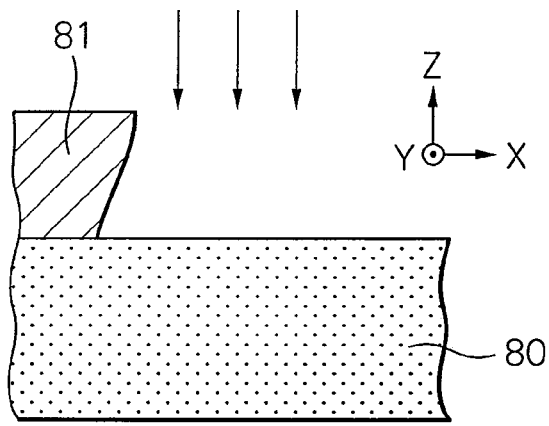
Fig. 8a1
Fig. 8a2
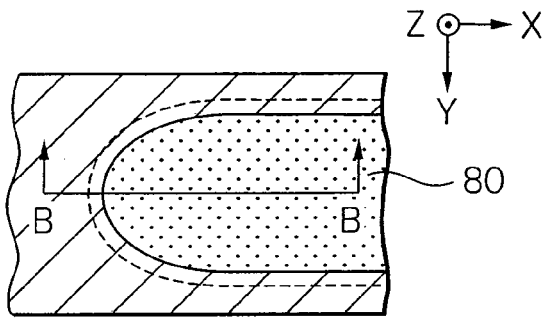
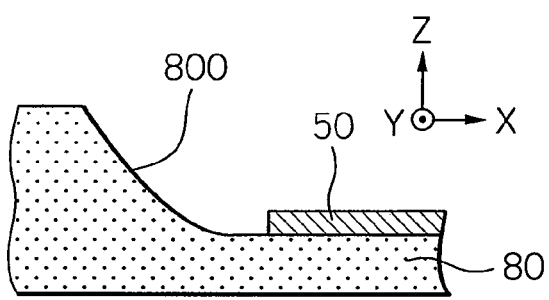
Fig. 8b1
Fig. 8b2
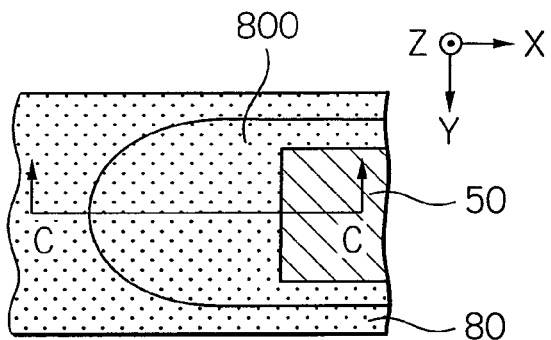
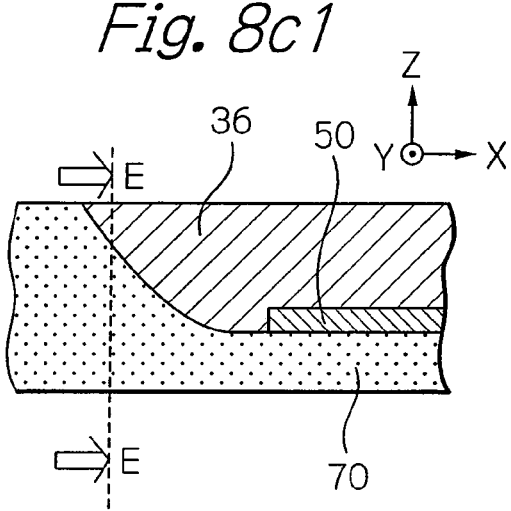
Fig. 8c1
Fig. 8c2
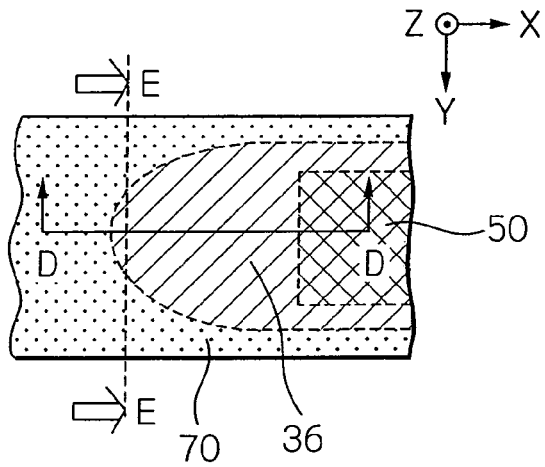

NEAR-FIELD LIGHT GENERATING ELEMENT AND HEAT-ASSISTED MAGNETIC RECORDING HEAD UTILIZING SURFACE PLASMON MODE

BACKGROUND OF THE INVENTION

1. Field of the Invention

The present invention relates to an element for generating near-field light, and to a heat-assisted magnetic recording method for performing a magnetic recording in which a magnetic recording medium is irradiated with near-field light, thereby anisotropic magnetic field of the medium is lowered. Further, the present invention relates to a magnetic recording head for writing data by the heat-assisted magnetic recording method.

2. Description of the Related Art

As the recording density of a magnetic disk apparatus becomes higher, further improvement has been required in the performance of a thin-film magnetic head and a magnetic recording medium. As the thin-film magnetic head, a composite-type thin-film magnetic head is widely used, which has a stacked structure of a magnetoresistive (MR) element for reading data and an electromagnetic transducer for writing data.

Whereas, the magnetic recording medium is generally a kind of discontinuous body of magnetic microparticles gathered together. Here, one record bit consists of a plurality of the magnetic microparticles. Therefore, in order to improve the recording density, it is necessary to decrease the size of the magnetic microparticles and reduce irregularity in the boundary of the record bit. However, the decrease in size of the magnetic microparticles raises a problem of degradation in thermal stability of the magnetization due to the decrease in volume.

As a measure against the thermal stability problem, it may be possible to increase the magnetic anisotropy energy $K_U$ of the magnetic microparticles. However, the increase in energy $K_U$ causes the increase in anisotropic magnetic field (coercive force) of the magnetic recording medium. Whereas, write field intensity of the thin-film magnetic head is limited by the amount of saturation magnetic flux density of the soft-magnetic material of which the magnetic core of the head is formed. Therefore, the head cannot write data to the magnetic recording medium when the anisotropic magnetic field (coercive force) of the medium exceeds the write field limit.

Recently, as a method for solving this problem of thermal stability, so-called a heat-assisted magnetic recording technique is proposed, in which writing is performed by reducing the anisotropic magnetic field with heat supplied to the magnetic recording medium formed of a magnetic material with a large $K_U$ just before applying write field. The heat-assisted magnetic recording technique has some similarity to a magneto-optic recording technique. However in the magneto-optic recording technique, the area to which light is applied determines spatial resolution of record bits (that is, a light-dominant technique). Whereas in the heat-assisted magnetic recording technique, the area to which magnetic field is applied determines spatial resolution of record bits (that is, a magnetic-field-dominant technique).

As a heat-assisted magnetic recording technique, a method has been generally known, in which a near-field light probe formed of a metal piece, so-called a plasmon antenna, is used for generating near-field light from plasmon that is excited by irradiated laser light. For example, U.S. Pat. No. 6,768,556 B1 discloses a plasmon antenna that includes a metal scatterer with a strobilus shape formed on a substrate and a dielectric material film formed around the metal scatterer. And US Patent Publication No. 2004/081031 A1 discloses a configuration in which a plasmon antenna is formed in contact with the main magnetic pole of a magnetic head for perpendicular magnetic recording in such a way that the irradiated surface of the plasmon antenna is perpendicular to the surface of a magnetic recording medium. Further, US Patent Publication No. 2003/066944 A1 discloses a technique in which the tip of a plasmon antenna is made closer to a magnetic recording medium to attempt to irradiate the medium with stronger near-field light.

However, a difficult problem may arise as described below in achieving the heat-assisted magnetic recording by using a plasmon antenna as a near-field light generating part.

It is generally known that, while the plasmon antenna converts the laser light irradiating the plasmon antenna into near-field light as described above, its light use efficiency is around 10% at the highest. That is, most of the irradiating laser light is changed into thermal energy within the plasmon antenna except the light component reflecting off the surface of the plasmon antenna. Here, the size of the plasmon antenna is set to the wavelength of the laser light or less, and its volume is very small. Therefore, the plasmon antenna is brought into a very high temperature due to the thermal energy. For example, a simulation result has been obtained, in which, when a plasmon antenna, which is a flat plate formed of Au and having an equilateral triangle shape with each edge of 300 nm (nanometers) and a thickness of 50 nm, absorbs the laser light of 17 mW at room temperature, its temperature rises to 500° C. (degrees centigrade).

Such temperature rise causes the plasmon antenna to thermally expand and to protrude from an opposed-to-medium surface toward the magnetic recording medium. Resultantly, such a situation is possible to occur that the end of a read head element reaching the opposed-to-medium surface relatively moves away from the magnetic recording medium, the read head element provided for reading data signals or servo signals from the magnetic recording medium. In this case, during write operation in which the magnetic recording medium is irradiated with the near-field light by using the plasmon antenna, it becomes difficult to read the servo signals well.

It is conceivable to compensate such protrusion of the plasmon antenna (and the end of a write head element) by protruding the end of the read head element with heat generated from a heating resistor provided in advance, but it is difficult to put the compensation into practice. Actually, while a response time from the irradiation of laser light to the thermal expansion of the plasmon antenna is of the order of 10 µsec (microseconds), a response time from power-on of the heating resistor to thermal expansion of the end of the read head element is of the order of 100 µsec, that is, one digit larger. Resultantly, it is very difficult for the end of the read head element to protrude without delay and follow the thermal expansion of the plasmon antenna during write operation.

Moreover, under this very high temperature of the plasmon antenna, the electric resistance of the plasmon antenna becomes significantly high. That is, thermal disturbance of free electrons in the plasmon antenna becomes large, which may cause further degradation of the aforementioned light use efficiency of the plasmon antenna.

Another problem may arise when the plasmon antenna is used in combination with a magnetic pole of the write head element. Practically, when the heat-assisted magnetic recording is carried out, it is necessary to provide the plasmon antenna and the magnetic pole so as to be positioned as close as possible to each other. Particularly, it is preferable to set a distance between both parts to 100 nm or less. With this arrangement, the field gradient of write field given from the magnetic pole can be made sufficiently large at the position irradiated by the near-field light on the magnetic recording medium. In this case, however, as disclosed in US Patent Publication No. 2004/081031 A1, the laser light to irradiate the plasmon antenna also passes through positions spaced apart from the magnetic pole by an extremely smaller distance than its own wavelength. Resultantly, a portion of the laser light is absorbed into the magnetic pole made of metal, which may reduce the amount of light to irradiate the plasmon antenna.

SUMMARY OF THE INVENTION

Therefore, an object of the present invention is to provide a near-field light generating element capable of avoiding excessive temperature rise of a near-field light generating part. Another object of the present invention is to provide a heat-assisted magnetic recording head capable of achieving better heat-assisted magnetic recording without excessive temperature rise of the near-field light generating part, to provide a head gimbal assembly (HGA) provided with the head, and further, to provide a magnetic recording apparatus provided with the HGA.

A further object of the present invention is to provide a magnetic recording method capable of achieving better heat-assisted magnetic recording without excessive temperature rise of the near-field light generating part.

Yet another object of the present invention is to provide a near-field light generating element and further a heat-assisted magnetic recording head, in which light use efficiency of a near-field light generating part is improved. Yet still another object of the present invention is to provide a heat-assisted magnetic recording head capable of propagating light to irradiate the near-field light generating part through positions spaced sufficiently apart from a magnetic pole.

Some terms used in the specification will be defined before explaining the present invention. In a layered structure or an element structure formed on an element-formation surface of a slider substrate of the magnetic recording head according to the present invention, when viewed from a standard layer or element, a substrate side is defined as "lower" side, and the opposite side as an "upper" side. Further, "X-, Y- and Z-axis directions" are indicated in some figures as needed. Here, Z-axis direction indicates above-described "up-and-low" direction, and +Z direction corresponds to a trailing side and −Z direction to a leading side. And Y-axis direction indicates a track width direction, and X-axis direction indicates a height direction.

Further, a "side surface" of a waveguide provided within the magnetic recording head is defined as an end surface other than the end surfaces perpendicular to the direction in which light propagates within the waveguide (−X direction), out of all the end surfaces surrounding the waveguide. According to the definition, an "upper surface" and a "lower surface" are one of the "side surfaces". The "side surface" is a surface on which the propagating light can be totally reflected within the waveguide corresponding to a core.

According to the present invention, a near-field light generating element is provided, which comprises:

a waveguide through which a light for generating near-field light propagates; and a near-field light generating layer comprising: a propagation surface on which surface plasmon excited by the light propagates; and a near-field light generating end at which near-field light is generated, the near-field light generating end being one end of the propagation surface, a portion of a side surface of the waveguide being opposed to a portion of the propagation surface of the near-field light generating layer with a predetermined spacing so that the light propagating through the waveguide is coupled with the near-field light generating layer in a surface plasmon mode.

In the near-field light generating element described above, the light propagating through the waveguide couples with an optical configuration of the waveguide and the near-field light generating layer, and induces a surface plasmon mode in the propagation surface of the near-field light generating layer. That is, the light couples with the near-field light generating layer in the surface plasmon mode. In such a surface plasmon mode, surface plasmon propagates on the propagation surface to generate near-field light. As a result, excessive temperature rise of the near-field light generating layer can be fully avoided, compared with a case in which a near-field light generating part such as a plasmon antenna is directly irradiated with the light to generate near-field light.

In the near-field light generating element according to the present invention, the near-field light generating layer is preferably tapered toward the near-field light generating end. And the near-field light generating layer is preferably formed of one element selected from a group of Pd, Pt, Rh, Ir, Ru, Au, Ag, Cu or Al, or an alloy made of at least two selected from the group.

Furthermore, in the near-field light generating element according to the present invention, the propagation surface is preferably covered with a material having a refractive index higher than a refractive index of a material covering a surface opposite to the propagation surface of the near-field light generating layer. Further, a portion sandwiched between the portion of the side surface of the waveguide and the portion of the propagation surface of the near-field light generating layer, which are opposed to each other, is preferably a buffering portion having a refractive index lower than a refractive index of the waveguide. In the case, the buffering portion is preferably a portion of an overcoat layer formed so as to cover the waveguide, and a length of the buffering portion is preferably in a range from 0.5 μm (micrometer) to 1.9 μm. Satisfying these conditions enables surface plasmon to be appropriately excited and to propagate favorably on the propagation surface of the near-field light generating layer. As a result, the light use efficiency of the near-field light generating element is improved.

According to the present invention, a heat-assisted magnetic recording head is further provided, which comprises:

a magnetic pole for generating write field from its end on an opposed-to-medium surface side;

a waveguide through which a light for generating near-field light propagates; and a near-field light generating layer comprising: a propagation surface on which surface plasmon excited by the light propagates; and a near-field light generating end at which near-field light is generated, the near-field light generating end being provided adjacent to an end of the magnetic pole and being one end of the propagation surface, a portion of a side surface of the waveguide being opposed to a portion of the propagation surface of the near-field light generating layer with a predetermined spacing so that the light propagating through the waveguide is coupled with the near-field light generating layer in a surface plasmon mode.

In the heat-assisted magnetic recording head described above, the light propagating through the waveguide couples with the near-field light generating layer in a surface plasmon mode. In such a surface plasmon mode, the surface plasmon propagates on the propagation surface of the near-field light generating layer to converge on a near-field light generating end, and generates near-field light. Accordingly, excessive temperature rise of the near-field light generating layer can be fully avoided, compared with a case in which the near-field light generating part such as a plasmon antenna is irradiated with the light to generate near-field light. Resultantly, unnecessary protrusion of the near-field light generating end toward a magnetic recording medium side can be suppressed, and further, sufficient light use efficiency can be achieved. In the heat-assisted magnetic recording head according to the present invention, the waveguide is preferably provided in a side opposite to the magnetic pole in relation to the near-field light generating layer. And an end portion on the opposed-to-medium surface side of the magnetic pole preferably has a shape extending slantwise toward an end portion on the opposed-to-medium surface side of the near-field light generating layer. Further, an end portion on the opposed-to-medium surface side of the near-field light generating layer preferably has a shape extending slantwise toward an end portion on the opposed-to-medium surface side of the magnetic pole. In the cases of having shapes extending slantwise, the distance between the waveguide and the magnetic pole can be set to be sufficiently large, and there can be avoided such a situation in which a part of the laser light is absorbed into the magnetic pole and the amount of light to be converted into near-field light is reduced.

Further, in the heat-assisted magnetic recording head according to the present invention, at least a portion of the propagation surface is preferably a planer or curved surface which inclines, relative to an element-formation surface of a substrate, toward an end portion on the opposed-to-medium surface side of the magnetic pole. Furthermore, the propagation surface is preferably covered with a material having a refractive index higher than a refractive index of a material covering a surface opposite to the propagation surface of the near-field light generating layer. In the case, a thermal conduction layer is preferably provided between the near-field light generating layer and the magnetic pole, so as to cover the surface opposite to the propagation surface of the near-field light generating layer. And an end on the opposed-to-medium surface side of the buffering portion is preferably positioned apart from the opposed-to-medium surface by a predetermined distance, the end of the buffering portion being a portion sandwiched between the portion of the side surface of the waveguide and the portion of the propagation surface of the near-field light generating layer, which are opposed to each other.

According to the present invention, a head gimbal assembly (HGA) is further provided, which comprises a heat-assisted magnetic recording head described above and a suspension supporting the heat-assisted magnetic recording head.

According to the present invention, a magnetic recording apparatus is further provided, which comprises: at least one HGA described above; at least one magnetic recording medium; and a recording circuit for controlling write operations which the heat-assisted magnetic recording head performs to the at least one magnetic recording medium, the recording circuit further comprising a light-emission control circuit for controlling operations of a light source that generates the light for generating near-field light.

According to the present invention, a magnetic recording method is further provided, which comprises steps of:

exciting surface plasmon in a near-field light generating layer by coupling a light propagating through a waveguide with the near-field light generating layer in a surface plasmon mode;

generating near-field light in an end on an opposed-to-medium surface side of the near-field light generating layer by making the surface plasmon propagate toward the opposed-to-medium surface on a surface of the near-field light generating layer;

making an anisotropic field of a portion of a magnetic recording medium lowered by irradiating the portion with the near-field light; and performing a write operation by applying write field generated from a magnetic pole to the portion with lowered anisotropic field of the magnetic recording medium.

In the magnetic recording method described above, because the near-field light is generated by utilizing the propagating surface plasmon, excessive temperature rise of the near-field light generating layer can be avoided, thereby an appropriate heat-assisted magnetic recording can be achieved.

In the magnetic recording method according to the present invention, the surface plasmon preferably propagates on a surface opposite to the magnetic pole in the near-field light generating layer. And the light propagating through the waveguide is preferably coupled with the near-field light generating layer in a position apart from the opposed-to-medium surface by a predetermined distance.

Further objects and advantages of the present invention will be apparent from the following description of preferred embodiments of the invention as illustrated in the accompanying figures. In each figure, the same element as an element shown in other figure is indicated by the same reference numeral. Further, the ratio of dimensions within an element and between elements becomes arbitrary for viewability.

BRIEF DESCRIPTION OF THE DRAWINGS

FIGS. 7a1 to 7e show schematic views illustrating the configurations in other embodiments of the heat-assisted magnetic recording head according to the present invention;

FIGS. 8a1 to 8c2 show schematic views illustrating one embodiment of the method for forming the waveguide, the buffering portion and the near-field light generating layer in the embodiment of FIG. 7c;

DESCRIPTION OF THE PREFERRED EMBODIMENTS

Figure 1:
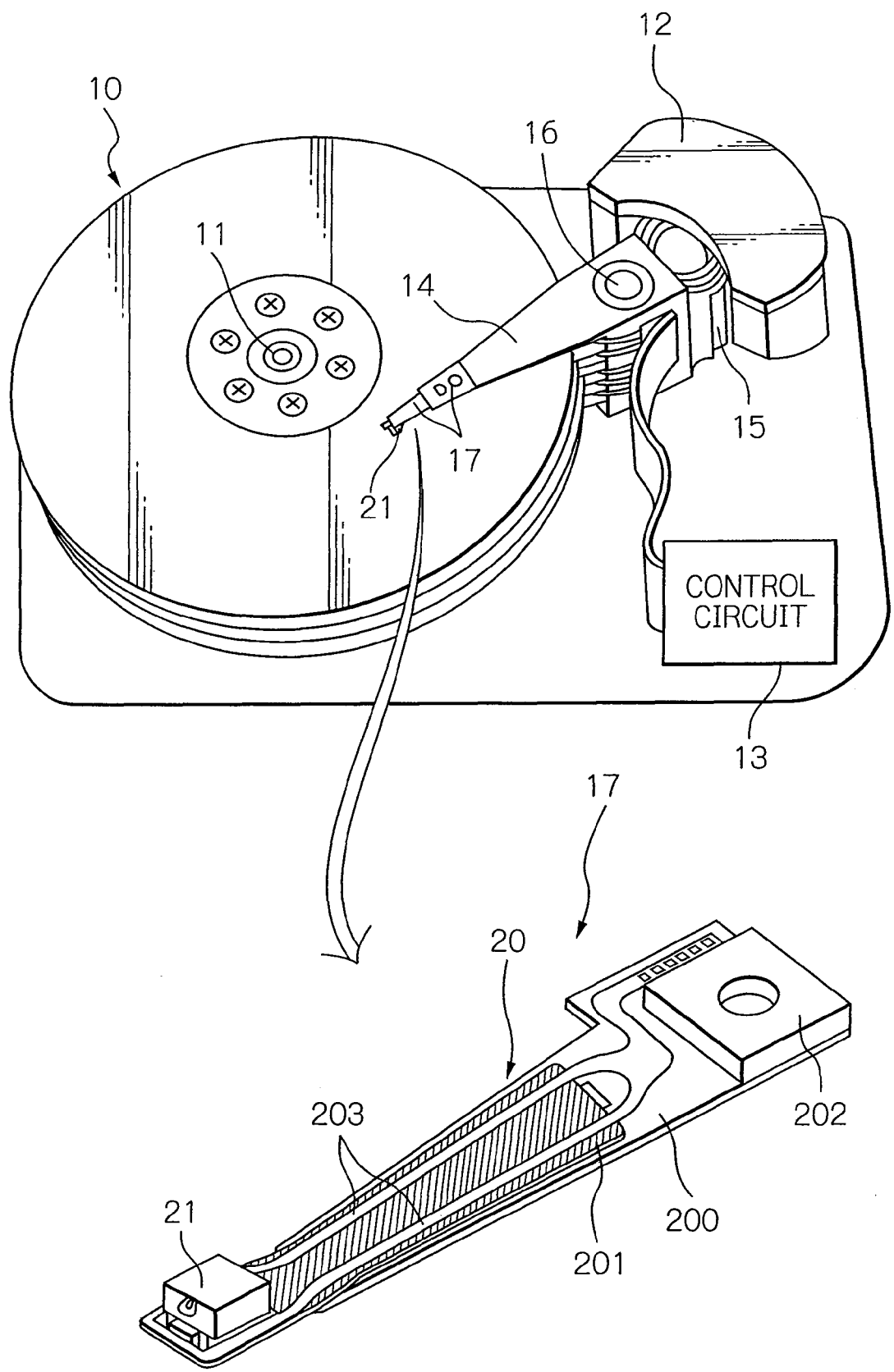
FIG. 1 shows a perspective view schematically illustrating a structure of a major part in one embodiment of a magnetic recording apparatus and an HGA according to the present invention

FIG. 1 shows a perspective view schematically illustrating a structure of a major part in one embodiment of a magnetic recording apparatus and an HGA according to the present invention. Here, in the perspective view of the HGA, the side of the HGA, opposed to the surface of the magnetic recording medium, is presented as the upper side.

A magnetic disk apparatus as a magnetic recording apparatus shown in FIG. 1 includes: a plurality of magnetic disks 10 as magnetic recording media, rotating around a rotational axis of a spindle motor 11; an assembly carriage device 12 provided with a plurality of drive arms 14 thereon; a head gimbal assembly (HGA) 17 attached on the top end portion of each drive arm 14 and provided with a heat-assisted magnetic recording head 21 as a thin-film magnetic head; and a recording/reproducing and light-emission control circuit 13 for controlling write/read operations of the heat-assisted magnetic recording head 21 and further for controlling the emission operation of a laser diode as a light source that generates laser light for heat-assisted magnetic recording, which will be described later.

In the present embodiment, the magnetic disk 10 is designed for perpendicular magnetic recording, and has a structure in which sequentially stacked on a disk substrate is: a soft-magnetic under layer; an intermediate layer; and a magnetic recording layer (perpendicular magnetization layer). The assembly carriage device 12 is a device for positioning the heat-assisted magnetic recording head 21 above a track formed on the magnetic recording layer of the magnetic disk 10, on which recording bits are aligned. In the apparatus, the drive arms 14 are stacked in a direction along a pivot bearing axis 16 and can be angularly swung around the axis 16 by a voice coil motor (VCM) 15. The structure of the magnetic disk apparatus according to the present invention is not limited to that described above. For instance, the number of each of magnetic disks 10, drive arms 14, HGAs 17 and heat-assisted magnetic recording heads 21 may be one.

Referring also to FIG. 1, a suspension 20 in the HGA 17 includes a load beam 200, a flexure 201 with elasticity fixed to the load beam 200, and a base plate 202 provided on the base portion of the load beam 200. Further, on the flexure 201, there is provided a wiring member 203 that is made up of lead conductors and connection pads electrically joined to both ends of the lead conductors. The heat-assisted magnetic recording head 21 is fixed to the flexure 201 at the top end portion of the suspension 20 so as to face the surface of each magnetic disk 10 with a predetermined spacing (flying height). Moreover, one ends of the wiring member 203 are electrically connected to terminal electrodes of the heat-assisted magnetic recording head 21.

The structure of the suspension 20 is not limited to the above-described one. An IC chip for driving the head may be mounted midway on the suspension 20, though not shown.

Figure 2:
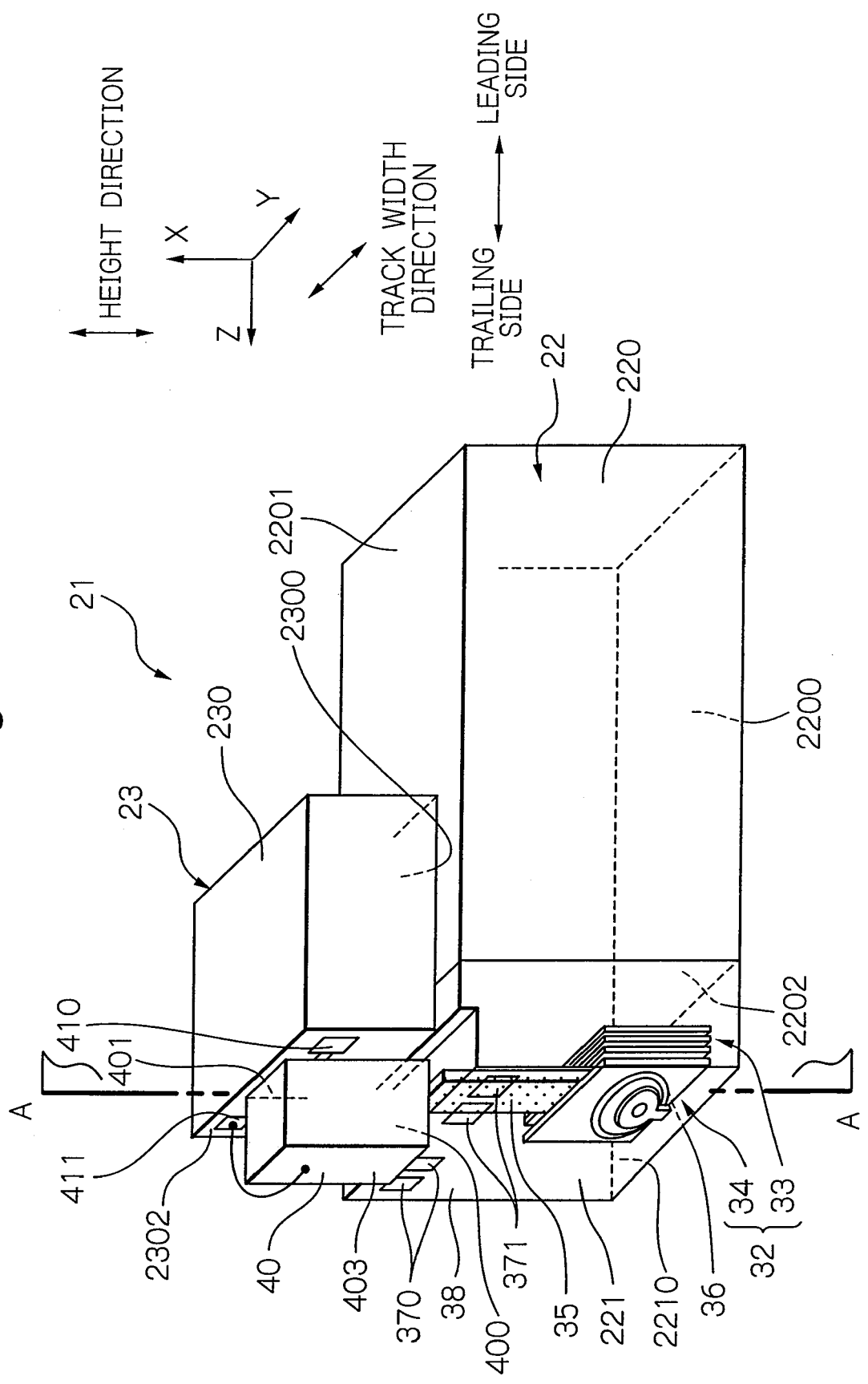
FIG. 2 shows a perspective view illustrating one embodiment of heat-assisted magnetic recording head according to the present invention.

FIG. 2 shows a perspective view illustrating one embodiment of heat-assisted magnetic recording head 21 according to the present invention.

As shown in FIG. 2, a heat-assisted magnetic recording head 21 is constituted of the slider 22 and the light source unit 23. The slider 22 includes: a slider substrate 220 formed of, for example, AlTiC ($Al_2O_3$—TiC), and having an air bearing surface (ABS) 2200 processed so as to provide an appropriate flying height; and a head part 221 formed on an element-formation surface 2202 perpendicular to the ABS 2200. While, the light source unit 23 includes: a unit substrate 230 formed of, for example, AlTiC ($Al_2O_3$—TiC), and having an joining surface 2300; and a laser diode 40 as a light source provided on a source-installation surface 2302 perpendicular to the joining surface 2300. The slider 22 and the light source unit 23 are bonded to each other so that the back surface 2201 of the slider substrate 220 and the joining surface 2300 of the unit substrate 230 have a surface contact with each other. Here, the back surface 2201 of the slider substrate 220 is defined as an end surface opposite to the ABS 2200 of the slider substrate 220. Alternatively, the heat-assisted magnetic recording head 21 may have a configuration in which the laser diode 40 is provided directly on the slider 22 without using the light source unit 23.

In the slider 22, the head part 221 formed on the element-formation surface 2202 of the slider substrate 220 includes: a head element 32 constituted of a magnetoresistive (MR) element 33 for reading data from the magnetic disk and an electromagnetic transducer 34 for writing data to the magnetic disk; a waveguide 35 for guiding the laser light from a laser diode 40 as a light source provided in the light source unit 23 to the opposed-to-medium surface side; a near-field light generating layer 36; an overcoat layer 38 formed on the element-formation surface 2202, so as to cover the MR element 33, the electromagnetic transducer 34, the waveguide 35, and the near-field light generating layer; a pair of terminal electrodes 370 exposed in the upper surface of the overcoat layer 38 and electrically connected to the MR element 33; and a pair of terminal electrodes 371 also exposed in the upper surface of the overcoat layer 38 and electrically connected to the electromagnetic transducer 34. The terminal electrodes 370 and 371 are electrically connected to the connection pads of the wiring member 203 provided on the flexure 201 (FIG. 1).

One ends of the MR element 33, the electromagnetic transducer 34, and the near-field light generating layer 36 reach the head part end surface 2210, which is an opposed-to-medium surface of the head part 221. Here, the head part end surface 2210 and the ABS 2200 constitute the whole opposed-to-medium surface of the heat-assisted magnetic recording head 21. During actual write and read operations, the heat-assisted magnetic recording head 21 aerodynamically flies above the surface of the rotating magnetic disk with a predetermined flying height. Thus, the ends of the MR element 33 and electromagnetic transducer 34 face the surface of the magnetic recording layer of the magnetic disk with an appropriate magnetic spacing. Then, the MR element 33 reads data by sensing signal magnetic field from the magnetic recording layer, and the electromagnetic transducer 34 writes data by applying signal magnetic field to the magnetic recording layer. When writing data, laser light is generated from the laser diode 40 of the light source unit 23 and propagates through the waveguide 35. Then, the laser light is coupled with the near-field light generating layer 36 in a surface plasmon mode, and causes surface plasmon to be excited on the near-field light generating layer 36. The surface plasmon propagates on the surface of the near-field light generating layer 36 toward the head part end surface 2210, which causes near-field light to be generated from the end on the head part end surface 2210 side of the near-field light generating layer 36. The generated near-field light reaches the surface of the magnetic disk, and heats a portion of the magnetic recording layer of the magnetic disk. As a result, the anisotropic magnetic field (coercive force) of the portion is decreased to a value that enables writing; thus the heat-assisted magnetic recording can be accomplished.

Figure 3:
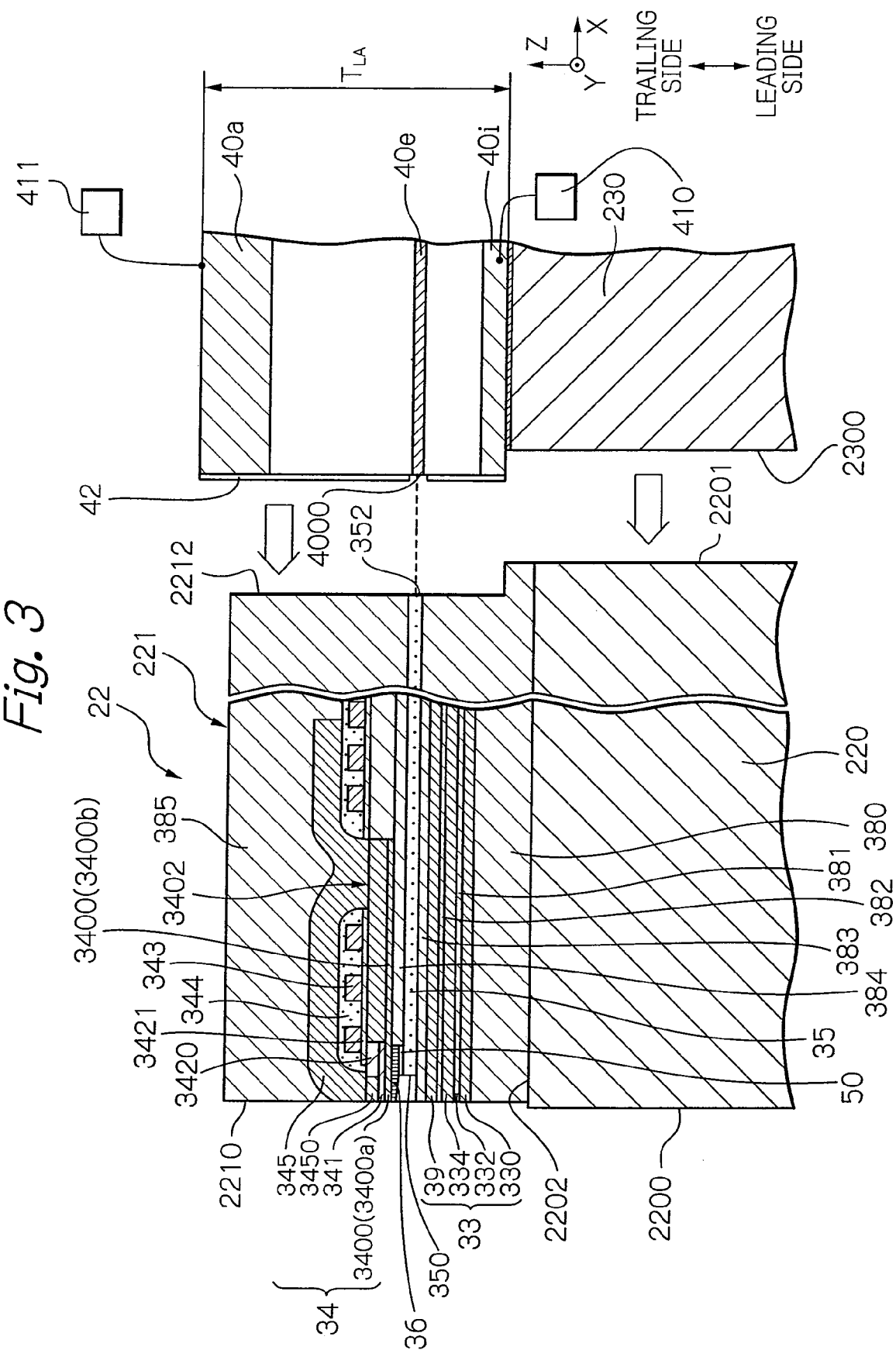
FIG. 3 shows a cross-sectional view taken by plane A in FIG. 2, schematically illustrating a main part of the heat-assisted magnetic recording head.

FIG. 3 shows a cross-sectional view taken by plane A in FIG. 2, schematically illustrating a main part of the heat-assisted magnetic recording head 21.

As shown in FIG. 3, the MR element 33 is formed on the insulating layer 380 stacked on the element-formation surface 2202, and includes: an MR multilayer 332; and a lower shield layer 330 and an upper shield layer 334 which sandwich the MR multilayer 332 and the insulating layer 381 therebetween. The upper and lower shield layers 334 and 330 prevent the MR multilayer 332 from receiving external magnetic field as a noise. The upper and lower shield layers 334 and 330 are magnetic layers formed of soft-magnetic materials such as NiFe (Permalloy), FeSiAl (Sendust), CoFeNi, CoFe, FeN, FeZrN or CoZrTaCr, or the multilayer of at least two of these materials, with thickness of approximately 0.5 to 3 μm, by using a frame plating method or a sputtering method.

The MR multilayer 332 is a magneto-sensitive part for detecting signal magnetic field by using MR effect. The MR multilayer 332 may be, for example: a current-in-plane giant magnetoresistive (CIP-GMR) multilayer that utilizes CIP-GMR effect; a current-perpendicular-to-plane giant magnetoresistive (CPP-GMR) multilayer that utilizes CPP-GMR effect; or a tunnel magnetoresistive (TMR) multilayer that utilizes TMR effect. The MR multilayer 332 that utilizes any MR effect described above can detect signal magnetic field from the magnetic disk with high sensitivity. In the case that the MR multilayer 332 is a CPP-GMR multilayer or a TMR multilayer, the upper and lower shield layers 334 and 330 act as electrodes. Whereas, in the case that the MR multilayer 332 is a CIP-GMR multilayer, insulating layers are provided between the MR multilayer 332 and respective upper and lower shield layers 334 and 330; further, formed are MR lead layers that is electrically connected to the MR multilayer 332.

In the case of TMR multilayer, for example, the MR multilayer 332 may have a stacked structure in which sequentially stacked are: an antiferromagnetic layer made of, for example, IrMn, PtMn, NiMn or RuRhMn, with thickness of approximately 5 to 15 nm; a magnetization-direction-fixed layer (pinned layer) in which two ferromagnetic layers such as CoFe sandwich a non-magnetic metal layer such as Ru therebetween, and the direction of the magnetization is fixed by the antiferromagnetic layer; a tunnel barrier layer made of a non-magnetic dielectric material obtained by the process that a metal film such as Al or AlCu, for example, with thickness of approximately 0.5 to 1 nm is oxidized by oxygen introduced into the vacuum equipment, or is naturally oxidized; and a magnetization-direction-free layer (free layer) having a double-layered structure of a ferromagnetic material such as CoFe, for example, with thickness of approximately 1 nm and a ferromagnetic material such as NiFe, for example, with thickness of approximately 3 to 4 nm, which has a tunnel exchange interaction with the pinned layer through the tunnel barrier layer.

Also as shown in FIG. 3, the electromagnetic transducer 34 is designed for perpendicular magnetic recording, and includes a main magnetic pole layer 340, a gap layer 341, a write coil layer 343, a coil insulating layer 344, and a write shield layer 345.

The main magnetic pole layer 340 is provided on an insulating layer 384 made of an insulating material such as $Al_2O_3$ (alumina), and acts as a magnetic path for converging and guiding a magnetic flux toward the magnetic recording layer (perpendicular magnetization layer) of the magnetic disk, the magnetic flux being excited by write current flowing through the write coil layer 343. The main magnetic pole layer 340 has a double-layered structure in which a main magnetic pole 3400 and a main pole body 3401 are stacked sequentially and magnetically coupled with each other. The main magnetic pole 3400 is isolated by being surrounded with an insulating layer 384 formed of an insulating material such as $Al_2O_3$ (alumina). The main magnetic pole 3400 reaches the head part end surface 2210, and includes: a main pole front end 3400a extending to the head part end surface 2210, with a small width $W_P$ (FIG. 5) in the track width direction; and a main pole rear end 3400b located at the rear of the main pole front end 3400a and having a width in the track width direction larger than that of the main pole front end 3400a. Here, the small width $W_P$ of the main pole front end 3400a enables a fine write magnetic field to be generated, so that the track width can be set to be a very small value adequate for higher recording density. The main pole 3400 is formed of a soft-magnetic material with saturation magnetic flux density higher than that of the main pole body 3401, which is, for example, an iron alloy containing Fe as a main component, such as FeNi, FeCo, FeCoNi, FeN or FeZrN. The thickness of the main magnetic pole 3400 is, for example, in the range of approximately 0.1 to 0.8 μm.

The gap layer 341 forms a gap provided for separating the main magnetic pole layer 340 from the write shield layer 345 in the region near the head part end surface. The gap layer 341 is formed, for example, of a non-magnetic insulating material such as $Al_2O_3$ (alumina), $SiO_2$ (silicon dioxide), AlN (aluminum nitride) or DLC, or formed of a non-magnetic conductive material such as Ru (ruthenium). The thickness of the gap layer 341 determines the spacing between the main magnetic pole layer 340 and the write shield layer 345, and is, for example, in the range of approximately 0.01 to 0.5 μm.

The write coil layer 343 is formed on a insulating layer 3421 made of an insulating material such as $Al_2O_3$ (alumina), in such a way to pass through in one turn at least between the main magnetic pole layer 340 and the write shield layer 345, and has a spiral structure with a back contact portion 3402 as a center. The write coil layer 343 is formed of a conductive material such as Cu (copper). The write coil layer 343 is covered with a coil insulating layer 344 that is formed of an insulating material such as a heat-cured photoresist and electrically isolates the write coil layer 343 from the main magnetic pole layer 340 and the write shield layer 345. The write coil layer 343 has a monolayer structure in the present embodiment, however, may have a two or more layered structure or a helical coil shape. Further, the number of turns of the write coil layer 343 is not limited to that shown in FIG. 3, and may be, for example, in the range from two to seven.

The write shield layer 345 reaches the head part end surface 2210, and acts as a magnetic path for the magnetic flux returning from a soft-magnetic under layer that is provided under the magnetic recording layer (perpendicular magnetization layer) of the magnetic disk. The thickness of the write shield layer 345 is, for example, approximately 0.5 to 5 μm. Further, the write shield layer 345 has a trailing shield 3450 that is a portion opposed to the main magnetic pole layer 340. The trailing shield 3450 also extends to the head part end surface 2210, and is provided for receiving the magnetic flux spreading from the main magnetic pole layer 340. In the present embodiment, the trailing shield 3450 is planarized together with an insulating layer 3420 and the main pole body 3401, and has a width in the track width direction larger than the width of the main pole rear end 3400b and the main pole body 3401 as well as the main pole front end 3400a. This trailing shield 3450 causes the magnetic field gradient between the end portion of the trailing shield 3450 and the main pole front end 3400a to become steeper. As a result, a jitter of signal output becomes smaller, and therefore, error rates during read operation can be reduced. The write shield layer 345 is formed of a soft-magnetic material; especially, the trailing shield 3450 is formed of a material with high saturation magnetic flux density such as NiFe (Permalloy) or formed of an iron alloy as the main magnetic pole 3400 is formed of.

Referring also to FIG. 3, the waveguide 35 and the near-field light generating layer 36 are provided between the MR element 33 and the electromagnetic transducer 34, and constitute an optical system within the head part 221. Here, the waveguide 35 is arranged in parallel with the element-formation surface 2202, and extends from an end surface 352 reaching the head part end surface 2212 to an end surface 350 on the ABS 2200 side reaching the head part end surface 2210. A portion of the upper surface (side surface) of the waveguide 35 faces a portion of the lower surface of the near-field light generating layer 36 with a predetermined spacing, and the sandwiched portion between these portions constitutes a buffering portion 50 having a refractive index lower than that of the waveguide 35. The buffering portion 50 acts for coupling the laser light that propagates through the waveguide 35 with the near-field light generating layer 36 in the surface plasmon mode. Here, the buffering portion 50 may be a portion of an insulating layer 384 that is a part of the overcoat layer 38, or a new layer provided other than the insulating layer 384. A detailed description of the waveguide 35, the near-field light generating layer 36, and the buffering portion 50 will be given later with reference to FIG. 4.

Further, in the present embodiment, an inter-element shield layer 39 is provided between the MR element 33 and the electromagnetic transducer 34 (waveguide 35), sandwiched by the insulating layers 382 and 383. The inter-element shield layer 39 plays a role for shielding the MR element 33 from the magnetic field generated from the electromagnetic transducer 34, and may be formed of the same soft-magnetic material as the upper and lower shield layers 334 and 330. The inter-element shield layer 39 is not indispensable: the embodiment without the inter-element shield layer could be in the scope of the present invention. Further, a backing coil portion may be provided between the inter-element shield layer 39 and the waveguide 35. The backing coil portion is a coil portion for generating magnetic flux to negate a magnetic flux loop that is generated from the electromagnetic transducer 34 and passes through the upper and lower shield layers 334 and 330 of the MR element 33. Thus, the backing coil portion intends to suppress wide adjacent track erasure (WATE), that is, unwanted writing or erasing to the magnetic disk.

Also according to FIG. 3, a light source such as InP base, GaAs base or GaN base diode can be utilized as the laser diode 40, which is usually used for communication, optical disk storage or material analysis. The wavelength $\lambda_L$ of the radiated laser light may be, for example, in the range of approximately 375 nm to 1.7 μm (micrometer). Specifically, for example, a laser diode of InGaAsP/InP quaternary mixed crystal can also be used, in which possible wavelength region is set to be from 1.2 to 1.67 μm. The laser diode 40 has a multilayered structure including an upper-electrode 40a, an active layer 40e, and a lower-electrode 40i. On the front and rear cleaved surfaces of the multilayered structure of the laser diode 40, respectively formed are reflective layers made of, for example, $SiO_2$ or $Al_2O_3$ for exciting the oscillation by total reflection. Further, the reflective layer 42 has an opening in the position of the active layer 40e including the light-emission center 4000. Here, the laser diode 40 has, for example, a thickness $T_{LA}$ of approximately 60 to 200 μm.

Further, an electric source provided within the magnetic disk apparatus can be used for driving the laser diode 40. In fact, the magnetic disk apparatus usually has an electric source with applying voltage of, for example, approximately 2V, which is sufficient for the laser oscillation. The amount of electric power consumption of the laser diode 40 is, for example, in the order of several tens mW, which can be covered sufficiently by the electric source provided within the magnetic disk apparatus. In practice, a predetermined voltage is applied between the terminal electrode 410 connected electrically to the lower-electrode 40i and the terminal electrode 411 connected electrically to the upper-electrode 40a by using the electric source, to oscillate the laser diode 40. Then, laser light radiates from the opening including the emission center 4000 of the reflective layer 42.

The laser diode 40 and terminal electrodes 410 and 411 are not limited to the above-described embodiment. Further, alternatively, the heat-assisted magnetic recording head 21 may include no laser diode 40; then, the light-emission center of a laser diode provided within the magnetic disk apparatus and the end surface 352 of the waveguide 35 may be connected by using optical fiber.

The light source unit 23 includes: the unit substrate 230; the laser diode 40 provided on the source-installation surface 2302 of the unit substrate 230; the terminal electrode 410 electrically connected to an electrode as the lower surface 401 of the laser diode 40; and the terminal electrode 411 electrically connected to an electrode as the upper surface 403 of the laser diode 40. The terminal electrodes 410 and 411 are electrically connected to the connection pads of the wiring member 203 provided on the flexure 201 (FIG. 1). By applying a predetermined voltage between both electrodes 410 and 411 of the laser diode 40, laser light radiates from the emission center on an emission surface 400 of the laser diode 40. Here, in the configuration of the head as shown in FIG. 3, the vibration of electric field component of the laser light generated from the laser diode 40 preferably has a direction perpendicular to the stacking surface of the active layer 40e (a Z-axis direction). That is, the laser diode 40 is preferably a chip for generating a laser light with TM polarization.

By joining the above-described slider 22 and light source unit 23, constituted is the heat-assisted magnetic recording head 21. In the joining, the joining surface 2300 of the unit substrate 230 is made having a surface contact with the back surface 2201 of the slider substrate 220. Then, the locations of the unit substrate 230 and the slider substrate 220 are determined so that the laser light generated from the laser diode 40 can directly enter the waveguide 35 through the end surface 352 opposite to the ABS 2200 of the waveguide 35.

Each of the slider 22 and light source unit 23 may have an arbitrary size. For example, the slider 22 may be so-called a femto slider in which the width in the track width direction (Y-axis direction) is 700 μm; the length (in Z-axis direction) is 850 μm; and the thickness (in X-axis direction) is 230 μm. In the case, the light source unit 23 may be one size smaller than the slider 22, for example, in which the width in the track width direction is 425 μm; the length is 300 μm; and the thickness is 300 μm.

Figure 4:
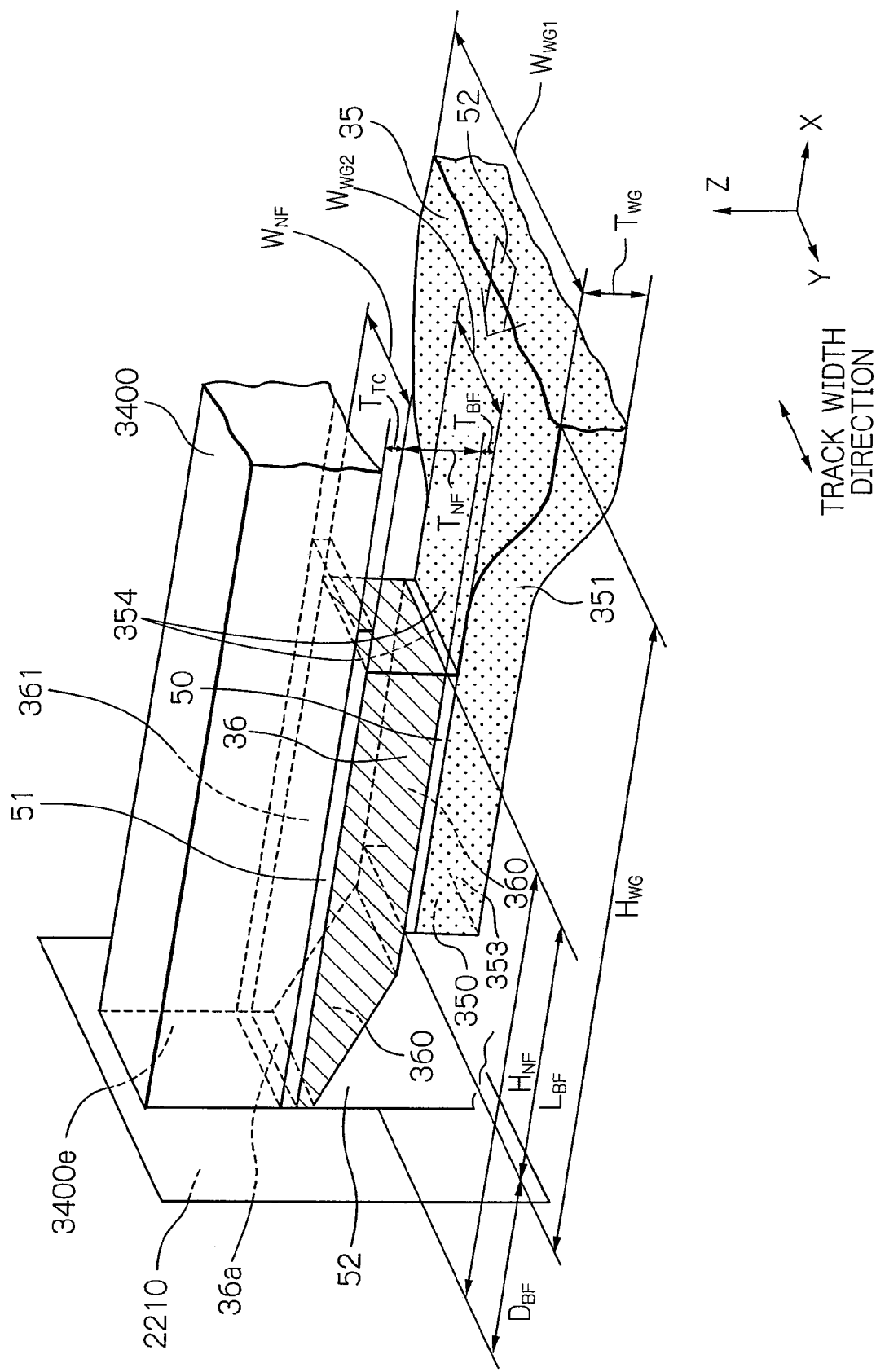
FIG. 4 shows a perspective view schematically illustrating the configuration of the waveguide, the near-field light generating layer and the main magnetic pole.

FIG. 4 shows a perspective view schematically illustrating the configuration of the waveguide 35, the near-field light generating layer 36 and the main magnetic pole 3400. In the figure, the head part end surface 2210 is positioned at the left side, the end surface 2210 including positions where write field and near-field light are emitted toward the magnetic recording medium.

Referring to FIG. 4, the configuration includes the waveguide 35 for propagating laser light 52 used for generating near-field light, and the near-field light generating layer 36 that has the propagation surface 360 for propagating surface plasmon excited by the laser light 52. Further, the buffering portion 50 is a portion sandwiched between a portion of the side surface 354 of the waveguide 35 and a portion of the propagation surface 360 of the near-field light generating layer 36, the portions being opposed to each other. The buffering portion 50 acts for coupling the laser light 52 with the near-field light generating layer 36 in the surface plasmon mode. Here, the side surface of the waveguide 35 indicates, out of end surfaces surrounding the waveguide 35, end surfaces other than the end surface 350 on the head part end surface 2210 side and the end surface 352 on the opposite side, the end surfaces 350 and 352 being perpendicular to the propagating direction (−X direction) of the laser light 52. The side surface serves as a surface on which the propagating laser light 52 can be totally reflected in the waveguide 35 that corresponds to a core. In the present embodiment, the side surface 354 of the waveguide 35, a portion of which is in surface contact with the buffering portion 50, is the upper surface of the waveguide 35. Similarly, the propagation surface 360, a portion of which is in surface contact with the buffering portion 50, is the lower surface of the near-field light generating layer 36. Here, the buffering portion 50 may be a portion of the overcoat layer 38 (FIG. 2) or a new layer provided other than the overcoat layer 38.

Further, the near-field light generating layer 36 has a near-field light generating end 36a reaching the head part end surface 2210. The near-field light generating end 36a is close to an end surface 3400e of the main magnetic pole 3400, the surface 3400e reaching the head part end surface 2210. Moreover, in the present embodiment, the near-field light generating layer 36 tapers toward the near-field light generating end 36a in the height direction (Z-axis direction), and the near-field light generating end 36a includes an end of the propagation surface 360 on the head part end surface 2210 side. A portion of the propagation surface 360 on the near-field light generating end 36a side is formed as a sloped plane inclined upward toward the end surface 3400e of the main magnetic pole 3400 relative to the element-formation surface 2202. Here, the surface plasmon, propagating along the propagation surface 360, reaches the near-field light generating end 36a to cause near-field light to be emitted from the near-field light generating end 36a. Alternatively, the portion of the propagation surface 360 on the near-field light generating end 36a side may be formed as a curved surface instead of a plane, the curved surface having a round edge at the periphery. Such a shape can suppress leakage of the surface plasmon from the propagation surface 360.

The waveguide 35 and the buffering portion 50 are provided in the side of −Z direction, that is, in the side opposite to the main magnetic pole 3400 in relation to the near-field light generating layer 36. As a result, the propagation surface 360, being in surface contact with the buffering portion 50, is also an end surface on the side opposite to the main magnetic pole 3400 in the near-field light generating layer 36. With such a configuration, even when a distance between the end surface 3400e of the main magnetic pole 3400 and the near-field light generating end 36a is adequately small, for example, 100 nm or less, the end surface 3400e generating write field and the generating end 36a emitting near-field light, the waveguide 35 can be sufficiently separated apart from the main magnetic pole 3400. Resultantly, there can be avoided such a situation in which a part of the laser light 52 is absorbed into the main magnetic pole 3400 made of metal and the amount of light to be converted into the near-field light is reduced.

Also as shown in FIG. 4, the waveguide 35 may have a rectangular parallelepiped shape, or may have a portion on the head part end surface 2210 side, which has a narrower width in the track width direction (Y-axis direction). The width $W_{WG1}$ in the track width direction (Y-axis direction) of a portion on the side of the end surface opposite to the head part end surface 2210 of the waveguide 35 may be, for example, in the range approximately from 0.5 to 200 μm (micrometers). The width $W_{WG2}$ in the track width direction (Y-axis direction) of a portion on the end surface 350 side of the waveguide 35 may be, for example, in the range approximately from 0.3 to 100 μm. And the thickness $T_{WG}$ (in Z-axis direction) may be, for example, in the range approximately from 0.1 to 4 μm, and the height (length) $H_{WG}$ (in X-axis direction) may be, for example, in the range approximately from 10 to 300 μm.

Further, the side surfaces of the waveguide 35: the upper surface 354; the lower surface 353; and both the side surfaces 351 in the track width direction (Y-axis direction) have a contact with the overcoat layer 38 (FIG. 2) except the portion having a surface contact with the buffering portion 50. Here, the waveguide 35 is formed of a material with refractive index $n_{WG}$ higher than refractive index $n_{OC}$ of the constituent material of the overcoat layer 38, made by using, for example, a sputtering method. For example, in the case that the overcoat layer 38 is formed of $SiO_2$ (n=1.46) or $Al_2O_3$ (n=1.65) under the laser light wavelength $\lambda_L$ of 1.55 μm, the waveguide 35 can be formed of, for example, Si (n=3.5). This material structure of the waveguide 35 enables the propagation loss of laser light to be reduced due to the excellent optical characteristics of the constituent material. Further, the waveguide 35 can provide the total reflection in all the side surfaces due to the existence of the overcoat layer 38 as a clad. As a result, more amount of laser light 52 can reach the position of the buffering portion 50, which improves the propagation efficiency of the waveguide 35.

Further, alternatively, it is preferable that the waveguide 35 has a multilayered structure of dielectric materials in which the upper a layer is, the higher becomes the refractive index n of the layer. The multilayered structure can be realized, for example, by sequentially stacking dielectric materials of $SiO_XN_Y$ with the composition ratios X and Y appropriately changed. The number of stacked layers may be, for example, in the range from 8 to 12. In the case that laser light 52 has a linear polarization in Z-axis direction, the above-described structure enables the laser light 52 to propagate in the position closer to the buffering portion 50. In this case, by choosing the composition, the layer thickness and the number of layers in each layer of the multilayered structure, the laser light 52 can propagate in the desired position in Z-axis direction.

The near-field light generating layer 36 is preferably formed of a conductive material of, for example, metal such as Pd, Pt, Rh, Ir, Ru, Au, Ag, Cu or Al, or an alloy made of at least two of these elements. Further, the near-field light generating layer 36 can have a width $W_{NF}$ in the track width direction (Y-axis direction) sufficiently smaller than the wavelength of the laser light 52, for example, of approximately 10 to 100 nm. And the near-field light generating layer 36 can have a thickness $T_{NF}$ (in Z-axis direction) sufficiently smaller than the wavelength of the laser light 52, for example, of approximately 10 to 100 nm. Further, the height $H_{NF}$ (in X-axis direction) can be set to be, for example, in the range of, approximately, 0.8 to 6.0 μm.

The buffering portion 50 is formed of a dielectric material having a refractive index $n_{BF}$ lower than the refractive index $n_{WG}$ of the waveguide 35. For example, when the wavelength $\lambda_L$ of the laser light is 1.55 μm and the waveguide 35 is formed of Si (n=3.5), the buffering portion 50 may be formed of SiO$_2$ (n=1.46) or Al$_2$O$_3$ (n=1.65). Therefore, the buffering portion 50 can be a portion of the overcoat layer 38 (FIG. 2) serving as a clad made of SiO$_2$ (n=1.46) or Al$_2$O$_3$ (n=1.65). It is also possible that the waveguide 35 is formed of Si (n=3.5) and the overcoat layer 38 serving as a clad is formed of Al$_2$O$_3$ (n=1.65). The height (in the X-axis direction) of the buffering portion 50, namely, the length $L_{BF}$ of a coupling portion between the waveguide 35 and the near-field light generating layer 36 is preferably in the range of 0.5 to 5 μm. Preferably, the thickness $T_{BF}$ (in the Z-axis direction) of the buffering portion 50 is in the range of 10 to 200 nm. The length $L_{BF}$ and the thickness $T_{BF}$ are important parameters for obtaining proper excitation and propagation of surface plasmon as will be described later in detail. The end on the head part end surface 2210 side of the buffering portion 50 is positioned apart from the head part end surface 2210 by a distance $D_{BF}$. A propagation distance of surface plasmon is adjusted by the distance $D_{BF}$.

As shown in FIG. 4, a thermal conduction layer 51 is preferably provided on the head part end surface 2210 side between the near-field light generating layer 36 and the main magnetic pole 3400. The thermal conduction layer 51 is formed of, for example, an insulating material such as AlN, SiC or DLC, which has higher thermal conductivity compared with that of the overcoat layer 38 (FIG. 2). Arrangement of such a thermal conduction layer 51 allows a part of the heat generated when the near-field light generating layer 36 emits near-field light to get away to the main magnetic pole 3400 through the thermal conduction layer 51. That is, the main magnetic pole 3400 can be used as a heatsink. Resultantly, excessive temperature rise of the near-field light generating layer 36 can be suppressed, and there can be avoided unwanted protrusion of the near-field light generating end 36a and substantial reduction in the light use efficiency of the near-field light generating layer 36.

The thickness $T_{TC}$ of the thermal conduction layer 51 corresponds to a distance $D_{N-P}$ (FIG. 5) between the near-field light generating end 36a and the end surface 3400e of the main magnetic pole 3400, and is set to be, for example, 100 nm or less. Further, the refractive index $n_{IN2}$ of the thermal conduction layer 51 is set smaller than the refractive index $n_{IN1}$ of the insulating layer 52 that covers the propagation surface 360 of the near-field light generating layer 36. That is, the propagation surface 360 of the near-field light generating layer 36 is covered with a material having a higher refractive index $n_{IN1}$ than the refractive index $n_{IN2}$ of a material covering the end surface 361 opposite to the surface 360. This allows surface plasmon to propagate on the propagation surface 360. It is known to be preferable in practice to satisfy the relation of refractive index $n_{IN1} \geq$ refractive index $n_{IN2} \times 1.5$.

Figure 5:
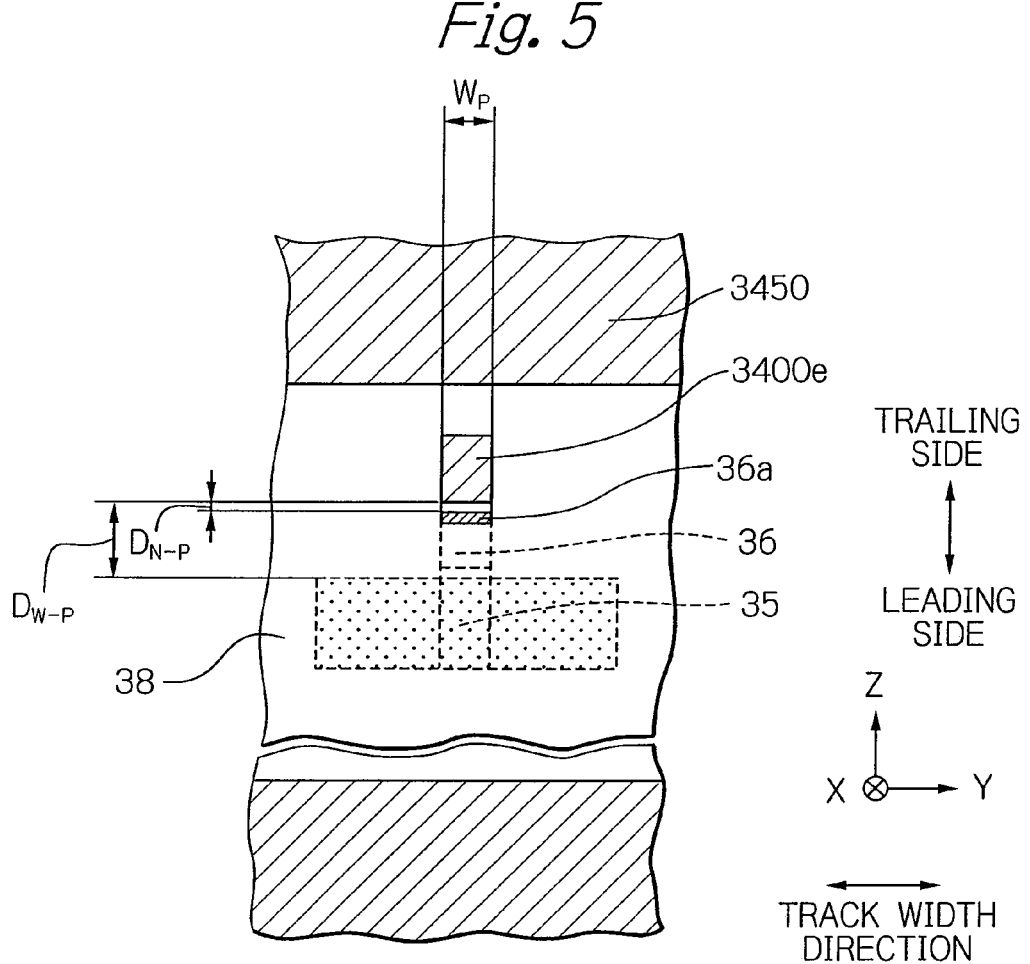
FIG. 5 shows a plan view illustrating end shapes of the near-field light generating layer and the electromagnetic transducer on the head part end surface.

FIG. 5 shows a plan view illustrating end shapes of the near-field light generating layer 36 and the electromagnetic transducer 34 on the head part end surface 2210.

As shown in FIG. 5, the main magnetic pole 3400 and a write shield layer 345 (trailing shield 3450) of the electromagnetic transducer 34 reach the head part end surface 2210. In the figure, the shape of the end surface of the main magnetic pole 3400 on the head part end surface 2210 is, for example, a rectangle, a square or a trapezoid. Here, the above-described width $W_P$ is a length of the edge on the leading side of the end surface of the main magnetic pole 3400, and provides the width of a track formed on the magnetic recording layer of the magnetic disk. The width $W_P$ is, for example, in the range of approximately 0.05 to 0.5 μm.

Moreover, on the head part end surface 2210, the near-field light generating end 36a of the near-field light generating layer 36 is positioned close to the end surface 3400e of the main magnetic pole 3400 and in the leading side (–Z direction) of the end surface 3400e. Here, a spacing $D_{N-P}$ between the near-field light generating end 36a and the end surface 3400e is set to be, for example, 100 nm or less. In the heat-assisted magnetic recording according to the present invention, the near-field light generating end 36a functions as a main heating action part, and the end surface 3400e functions as a writing action part. Therefore, write field can be applied to a portion of the recording layer of the magnetic disk immediately after heating the portion. This enables a stable heat-assisted write operation to be securely achieved.

Furthermore, a spacing $D_{W-P}$ between the waveguide 35 and the main magnetic pole 3400 is made sufficiently large while the spacing $D_{N-P}$ is set to a minute value as described above. That is, with the structure according to the present invention shown in FIG. 4, the waveguide 35 can be sufficiently separated apart from the main magnetic pole 3400. Resultantly, there can be avoided such a situation in which a part of the laser light is absorbed into the main magnetic pole 3400 made of metal and the amount of light to be converted into near-field light is reduced.

Figure 6:
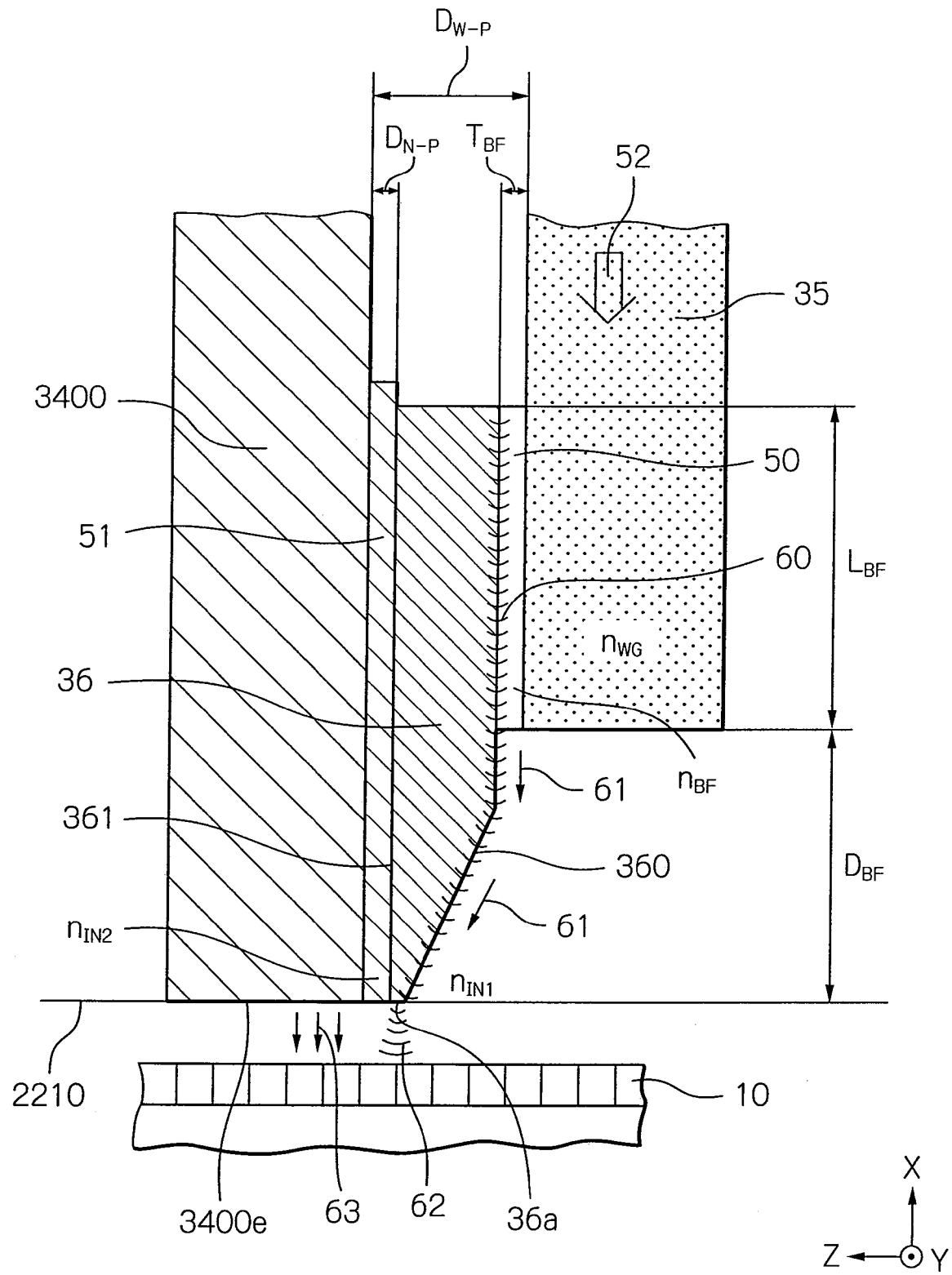
FIG. 6 shows a schematic diagram for explaining the heat-assisted magnetic recording utilizing the surface plasmon mode according to the present invention.

FIG. 6 shows a schematic diagram for explaining the heat-assisted magnetic recording utilizing the surface plasmon mode according to the present invention.

Referring to FIG. 6, when the electromagnetic transducer 34 writes data onto the recording layer of the magnetic disk 10, first, laser light 52 radiated from the laser diode 40 of the light source unit 23 propagates through the waveguide 35. Next, the laser light 52, which has advanced to near the buffering portion 50, couples with the optical configuration including the waveguide 35 with a refractive index $n_{WG}$, the buffering portion 50 with a refractive index $n_{BF}$ and the near-field light generating layer 36 made of conductive material such as metal, and induces the surface plasmon mode on the propagation surface 360 of the near-field light generating layer 36. That is, the laser light couples with the near-field light generating layer 36 in the surface plasmon mode. Actually, evanescent light is excited within the buffering portion 50 based on an optical boundary condition between the waveguide 35 as a core and the buffering portion 50. Then, the evanescent light couples with the fluctuation of electric charge excited on the metal surface (propagation surface 360) of the near-field light generating layer 36, and induces the surface plasmon mode. At this time, the surface plasmon mode can be induced by setting the refractive index $n_{BF}$ of the buffering portion 50 smaller than the refractive index $n_{WG}$ of the waveguide 35 ($n_{BF} < n_{WG}$), and further by properly selecting the height (in X-axis direction) of the buffering portion 50, namely, the length $L_{BF}$ of the coupling portion between the waveguide 35 and the near-field light generating layer 36, and the thickness $T_{BF}$ (in Z-axis direction) of the buffering portion 50. The inducement of the surface plasmon mode is described in, for example, Michael Hochberg, Tom Baehr-Jones, Chris Walker & Axel Scherer, "Integrated Plasmon and dielectric waveguides", OPTICS EXPRESS Vol. 12, No. 22, pp 5481-5486 (2004), and US patent Publication No. 2005/0249451 A1.

In the induced surface plasmon mode, the surface plasmon 60 is excited on the propagation surface 360 of the near-field light generating layer 36, and propagates on the propagation surface 360 along the direction shown by arrows 61. The propagation of the surface plasmon 60 can occur under such a condition that the propagation surface 360 of the near-field light generating layer 36 is covered with a material having a higher refractive index $n_{IN1}$ than the refractive index $n_{IN2}$ of a material covering the end surface 361 on the side opposite to the surface 360. It is known to be preferable in practice to satisfy the relation of refractive index $n_{IN1}$=refractive index $n_{IN2} \times 1.5$. In FIG. 6, the refractive index $n_{IN2}$ of the thermal conduction layer 51 is set so as to be smaller than the refractive index $n_{IN1}$ of the insulating layer 52 covering the propagation surface 360 of the near-field light generating layer 36.

By the above-described propagation of the surface plasmon 60, the surface plasmon 60, namely, electric field converges at the near-field light generating end 36a that is the destination of the propagation surface 360 and reaches the head part end surface 2210. As a result, near-field light 62 is emitted from the near-field light generating end 36a. The near-field light 62 is radiated toward the recording layer of the magnetic disk 10, and reaches the surface of the magnetic disk 10 to heat a portion of the recording layer of the magnetic disk 10. This heating reduces the anisotropic magnetic field (coercive force) of the portion to a value with which write operation can be performed. Immediately after the heating, write field 63 generated from the main magnetic pole 3400 is applied to the portion to perform write operation. Thus, a heat-assisted magnetic recording can be achieved.

In the heat-assisted magnetic recording with use of the surface plasmon mode, as presented later by using practical examples, the light use efficiency in the near-field light generating layer 36 is remarkably improved to be about 20%, while the use efficiency of a case, in which a conventional plasmon antenna is used, is around 5 to 10% or less as seen in reported examples. This improvement can prevent the excessive temperature rise of the near-field light generating layer 36, and can suppress the protrusion of the near-field light generating end 36a toward the magnetic disk 10.

Further, in a conventional case in which the laser light propagating through a waveguide directly irradiates a plasmon antenna provided on the end surface of a head, most of the irradiated laser light has been converted into thermal energy within the plasmon antenna. In this case, the size of the plasmon antenna has been set smaller than the wavelength of the laser light, and its volume is very small. Therefore, the plasmon antenna has been brought to a very high temperature, for example, 500° C. (degrees centigrade) due to the thermal energy.

On the contrary, in the heat-assisted magnetic recording according to the present invention, the surface plasmon mode is used, and the near-field light 62 is generated with the surface plasmon 60 propagated toward the head part end surface 2210. This brings the temperature at the near-field light generating end 36a to about 120° C. during the emission of near-field light, which is greatly reduced one as will be presented later by using practical examples. This reduction of temperature resultantly allows the protrusion of the near-field light generating end 36a toward the magnetic disk 10 to be suppressed, thereby better heat-assisted magnetic recording can be achieved.

FIGS. 7a1 to 7e show schematic views illustrating the configurations in other embodiments of the heat-assisted magnetic recording head according to the present invention.

Referring to FIGS. 7a1 and 7a2, a main magnetic pole 70 has a shape extending slantwise toward the end 36a on the head part end surface 2210 side of the near-field light generating layer 36. Here, "extending slantwise" means a state of extending slantwise downward or extending slantwise upward relative to the element-formation surface 2202. In the embodiment shown in FIGS. 7a1 and 7a2, the main magnetic pole 70 extends slantwise downward relative to the element-formation surface 2202. Concretely, the main magnetic pole 70 includes: a first main magnetic pole portion 700 having an end surface 70a reaching the head part end surface 2210; a second main magnetic pole portion 701, its end portion on the head part end surface 2210 side overlying a portion of the first main magnetic pole portion 700 on the side opposite to the head part end surface 2210; and a third main magnetic pole portion 702, its end portion on the head part end surface 2210 side overlying a portion of the second main magnetic pole portion 701 on the side opposite to the head part end surface 2210. In this embodiment, while the end surface 70a of the main magnetic pole 70 is positioned close to the near-field light generating end 36a on the head part end surface 2210, it is possible to set a distance $D_{W-P}'$ in Z-axis direction between the waveguide 35 and the main magnetic pole 70 (the third main magnetic pole portion 702) to be a sufficiently large value. With this configuration, there can be more securely avoided the situation in which a part of laser light is absorbed into the main magnetic pole and the amount of light to be converted into near-field light is reduced.

Figure 7B:
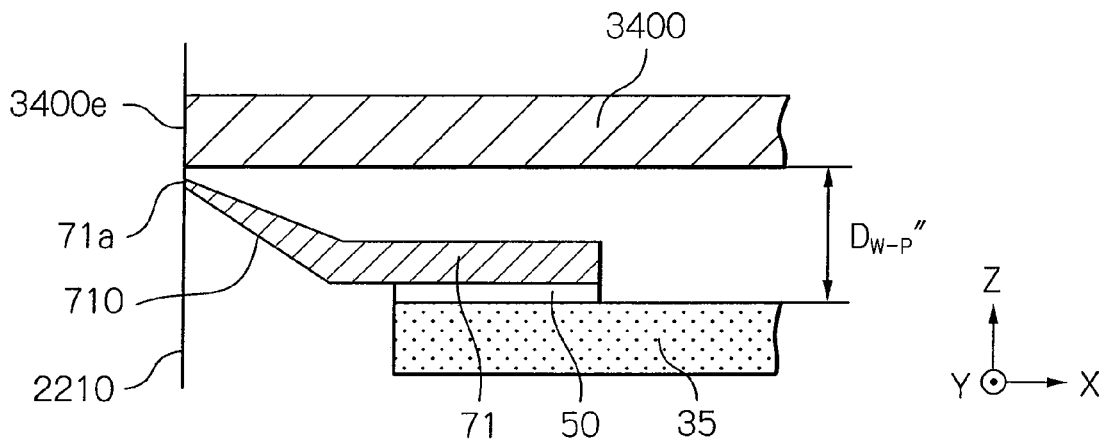

Referring to FIG. 7b, a near-field light generating layer 71 has a shape extending slantwise toward the end 3400e on the head part end surface 2210 side of the main magnetic pole 3400. In the embodiment shown in FIG. 7b, the near-field light generating layer 71 extends slantwise upward relative to the element-formation surface 2202. In such an embodiment, while the near-field light generating end 71a of the near-field light generating layer 71 is positioned close to the end surface 3400e of the main magnetic pole 3400 on the head part end surface 2210, it is possible to set a distance $D_{W-P}''$ in Z-axis direction between the waveguide 35 and the main magnetic pole 3400 to be a sufficiently large value. With this configuration, there can be more securely avoided the situation in which a part of laser light is absorbed into the main magnetic pole and the amount of light to be converted into near-field light is reduced.

Figure 7C:
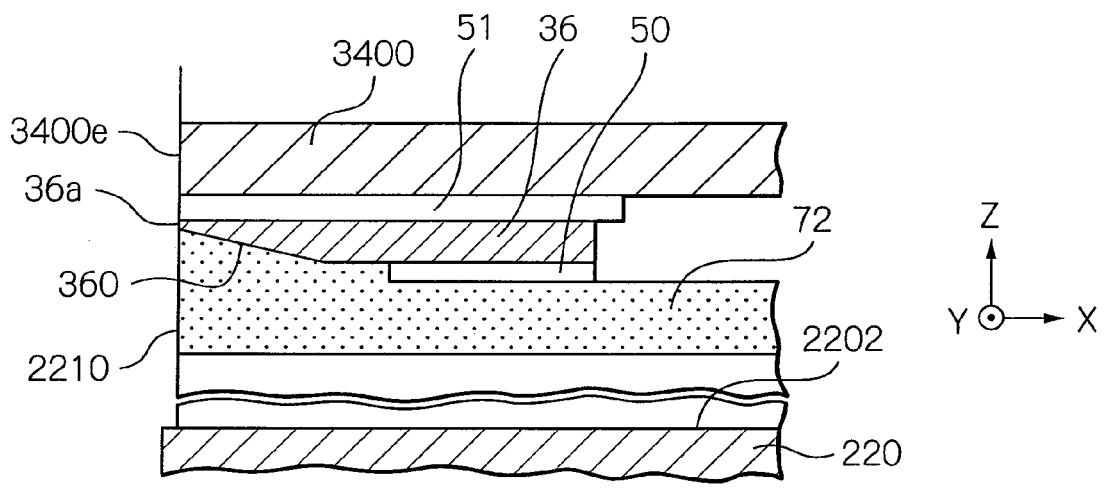

Referring to FIG. 7c, a waveguide 72 reaches the head part end surface 2210, and the upper surface of the waveguide 72 is in surface contact with the propagation surface 360 of the near-field light generating layer 36 as well as the lower surface of the buffering portion 50. In this embodiment, it becomes also possible for the excited surface plasmon to propagate on the propagation surface 360 and to generate near-field light at the near-field light generating end 36a, by setting the refractive index $n_{WG}$ of the waveguide 72 larger than the refractive index $n_{IN2}$ of the thermal conduction layer 51. This configuration shown in FIG. 7c is possible to be formed with relative ease. A method of forming the waveguide 72, the buffering portion 50 and the near-field light generating layer 36 will be explained in detail later with reference to FIGS. 8a1 to 8c2.

Figure 7D:
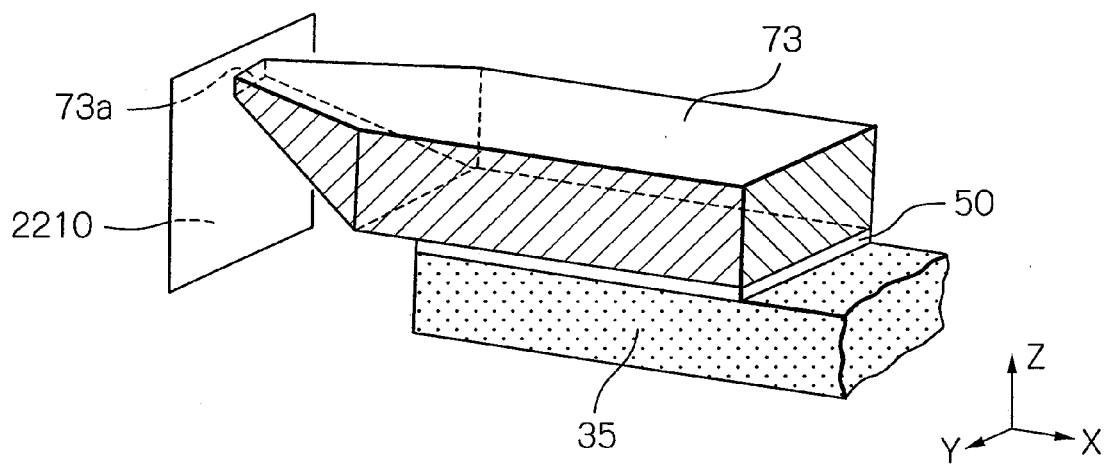

Referring to FIG. 7d, the end portion on the head part end surface 2210 side of a near-field light generating layer 73 is tapered toward the head part end surface 2210 not only in Z-axis direction but also in Y-axis direction. Accordingly, it is possible to make the area of the near-field light generating end 73a very small in the near-field light generating layer 73. As a result, it is possible to heat only a minuter region on the magnetic recording layer of a magnetic disk, and to contribute to making recording density higher. Such a near-field light generating layer, which is tapered also in Y-axis direction, can be naturally employed in any one of embodiments shown in FIG. 4 and FIGS. 7a1 to 7c.

Figure 7E:
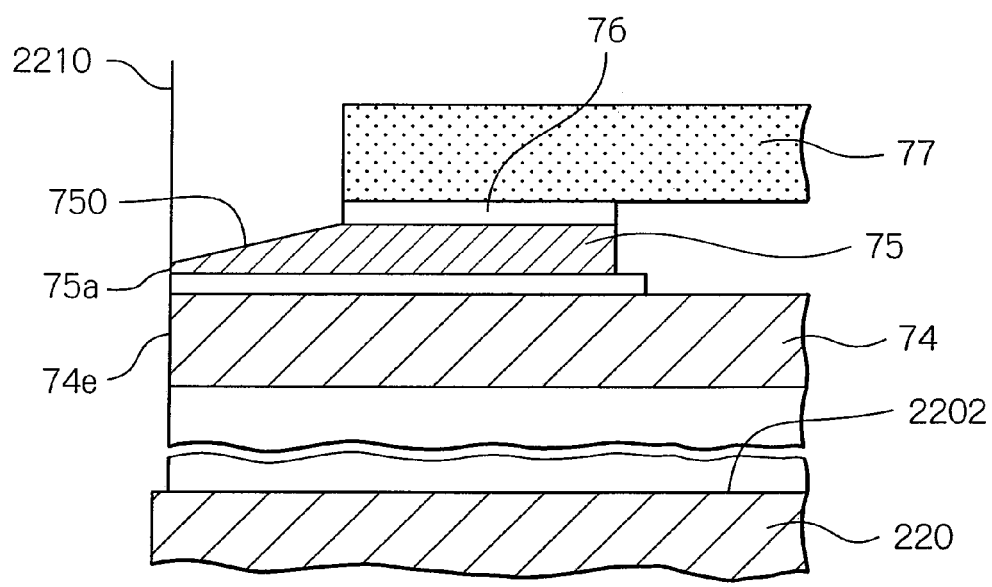

In the embodiment shown in FIG. 7e, a main magnetic pole 74, a near-field light generating layer 75, a buffering portion 76 and a waveguide 77 are stacked sequentially from the slider substrate 220 side toward +Z direction. Moreover, a portion on the near-field light generating end 75a side of the propagation surface 750 of the near-field light generating layer 75 is a planar or curved surface which inclines toward the end surface 74e of the main magnetic pole 74 downward relative to the element-formation surface 2202 of the slider substrate. In the embodiment in which the near-field light generating end 75a is arranged in the trailing side (+Z direction side) of the end surface 74e of the main magnetic pole 74 on the head part end surface 2210, it is also possible to prevent the temperature of the near-field light generating layer 75 from rising excessively, and to achieve better heat-assisted magnetic recording.

FIGS. 8a1 to 8c2 show schematic views illustrating one embodiment of the method for forming the waveguide 70, the buffering portion 50 and the near-field light generating layer 36 in the embodiment of FIG. 7c. Here, FIGS. 8a1, 8b1 and 8c1 are cross-sectional views taken along lines B-B, C-C and D-D in FIGS. 8a2, 8b2 and 8c2, respectively.

First, as shown in FIGS. 8a1 and 8a2, a mask pattern 81 made of, for example, a photo-resist is formed on a waveguide layer 80 made of, for example, Si by using, for example, a photolithography process. Next, as shown in FIGS. 8b1 and 8b2, a cavity 800 is formed by applying a dry etching such as ion milling to the waveguide layer 80.

Then, as shown in FIGS. 8b1 and 8b2, after removing the mask pattern 81, there is formed on the bottom surface of the formed cavity 800 a buffering portion 50 made of a dielectric material such as $SiO_2$ and $Al_2O_3$, by using, for example, a sputtering method and a photolithography process. Thereafter, a metal film made of, for example, Ag is stacked so as to cover the buffering portion 50 and fill the cavity 800 up, by using, for example, a sputtering method.

After that, by polishing the upper surface of the formed metal film with use of, for example, a chemical mechanical polishing (CMP) method, a near-field light generating layer 36 with the upper surface planarized is formed as shown in FIGS. 8c1 and 8c2. In machine processes of the head, the portion on the left side relative to the E surface shown in FIGS. 8c1 and 8c2 is cut and eliminated by applying an MR height process to decide the head part end surface 2210 and the height (length in X-axis direction) of the MR multilayer 332. With these processes, there is completed the formation of the configuration including the waveguide 70, the buffering portion 50 and the near-field light generating layer 36 in the embodiment shown in FIG. 7c.

Figure 9:
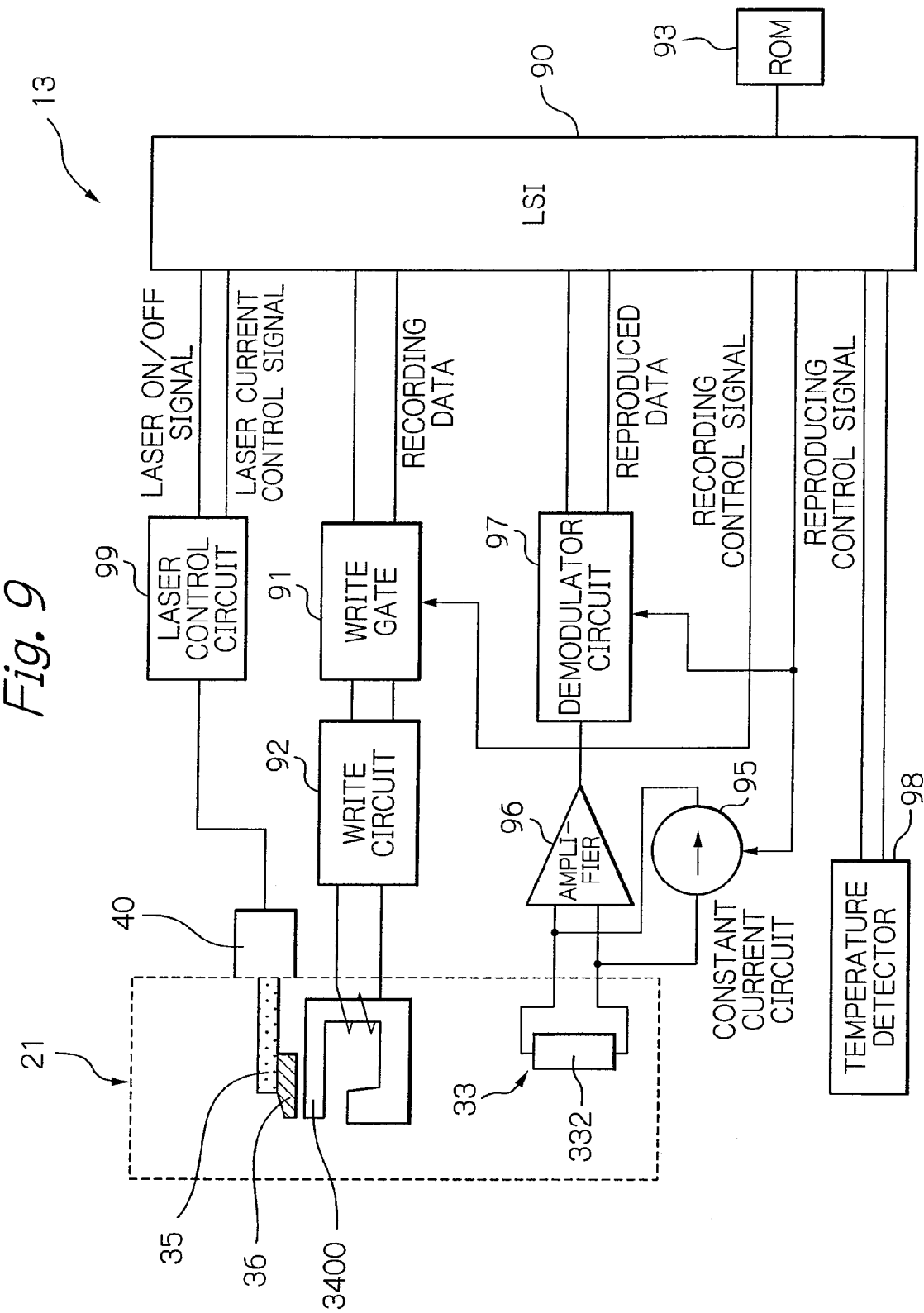
FIG. 9 shows a block diagram illustrating the circuit structure of the recording/reproducing and light-emission control circuit of the magnetic disk apparatus shown in FIG. 1.

FIG. 9 shows a block diagram illustrating the circuit structure of the recording/reproducing and light-emission control circuit 13 of the magnetic disk apparatus shown in FIG. 1.

In FIG. 9, reference numeral 90 indicates a control LSI, 91 indicates a write gate for receiving recording data from the control LSI 90, 92 indicates a write circuit, 93 indicates a ROM that stores a control table or the like for controlling the value of drive current supplying to the laser diode 40, 95 indicates a constant current circuit for supplying sense current to the MR element 33, 96 indicates an amplifier for amplifying the output voltage from the MR element 33, 97 indicates a demodulator circuit for outputting reproduced data to the control LSI 90, 98 indicates a temperature detector, and 99 indicates a control circuit for controlling the laser diode 40, respectively.

The recording data outputted from the control LSI 90 is supplied to the write gate 91. The write gate 91 supplies recording data to the write circuit 92 only when a recording control signal outputted from the control LSI 90 instructs a write operation. The write circuit 92 applies write current according to this recording data through the write coil layer 343, and a write operation is performed onto the magnetic disk by write field generated from the main magnetic pole 3400.

A constant current flows from the constant current circuit 95 into the MR multilayer 332 only when the reproducing control signal outputted from the control LSI 90 instructs a read operation. The signal reproduced by the MR element 33 is amplified by the amplifier 96, demodulated by the demodulator circuit 97, and then, the obtained reproduced data is outputted to the control LSI 90.

The laser control circuit 99 receives a laser ON/OFF signal and a drive current control signal, which are outputted from the control LSI 90. When the laser ON/OFF signal is an ON operation instruction, a drive current of an oscillation threshold value or more flows into the laser diode 40. Thereby, the laser diode 40 emits light; then the laser light propagates through the waveguide 35 and couples with the near-field light generating layer 36 in the surface plasmon mode. As a result, near-field light is generated from the end of the near-field light generating layer 36, irradiated on the recording layer of the magnetic disk, and heats the recording layer. The value of drive current in this occasion is controlled to a value corresponding to the laser current control signal. The control LSI 90 generates the laser ON/OFF signal with its timing adjusted according to recording/reproducing operations, and determines the value of laser current control signal, by referring the temperature value in the recording layer of the magnetic disk or the like, which is measured by the temperature detector 98, based on the control table in the ROM 93. The control table may include data about the relation between the drive current value and the mount of temperature increase by heat-assist operation in the recording layer, and data about the temperature independence of the anisotropic field (coercive force) of the recording layer, as well as the temperature dependences of the oscillation threshold and the characteristics of light output vs. drive current. Thus, it is possible to realize not only a current application to the laser diode 40 linked simply with the recording operation but also more diversified current application modes, by providing the system of the laser ON/OFF signal and laser current control signal independently from the recording/reproducing control signal system.

Obviously, the circuit structure of the recording/reproducing and light-emission control circuit 13 is not limited to that shown in FIG. 9. It is also possible to specify write and read operations by using a signal other than the recording control signal and reproducing control signal.

PRACTICAL EXAMPLES

Hereinafter, there will be shown effects of heat-assisted magnetic recording heads that utilizes the surface plasmon mode according to the present invention, by using a result of simulation analysis experiments performed as practical examples.

Figure 10A:
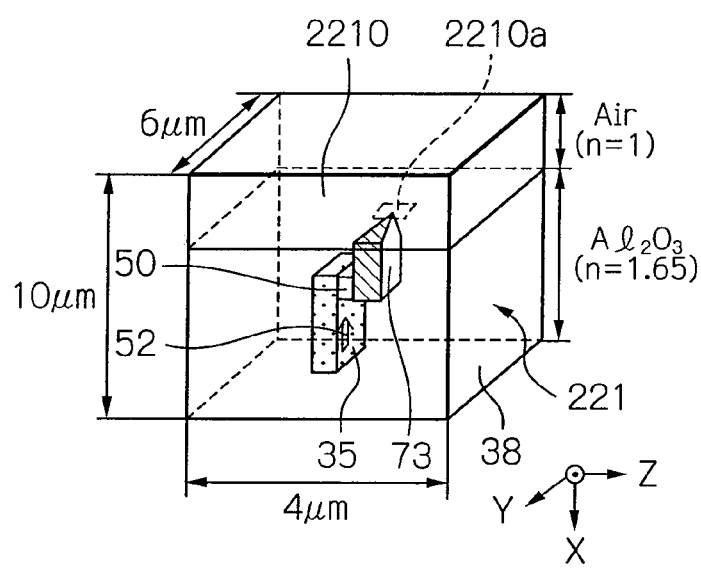
FIGS. 10a to 10d show schematic diagrams illustrating experiment conditions of the simulation analysis experiments performed as practical examples.
Figure 10B:
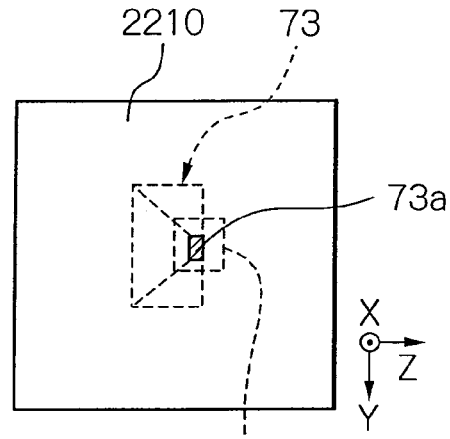

FIGS. 10a to 10d show schematic diagrams illustrating experiment conditions of the simulation analysis experiments performed as practical examples. Here, FIG. 10b is a top view illustrating a near-field light generating end 73a reaching the head part end surface 2210 in FIG. 10a.

Referring to FIGS. 10a and 10b, the simulation analysis experiments were performed by using a three-dimensional Finite-Difference Time-Domain method (FDTD method), which is an electromagnetic field analysis. The system, with which the simulation analysis experiments were performed, was a rectangular parallelepiped area of 4 µm×6 µm×10 µm, which includes: the head part 221 having a waveguide 35, a near-field light generating layer 73, and an overcoat layer 38; and an air layer (refractive index n=1) covering the head part end surface 2210. Incident laser light 52 was a Gaussian beam with a wavelength $\lambda_L$ of 1.55 μm and a spot size of 0.5 μm×4 μm, having a TM polarization (in which the oscillation direction of electric field of the laser light is perpendicular to the layer surface of the waveguide 35, that is, in Z-axis direction).

Figure 10C:
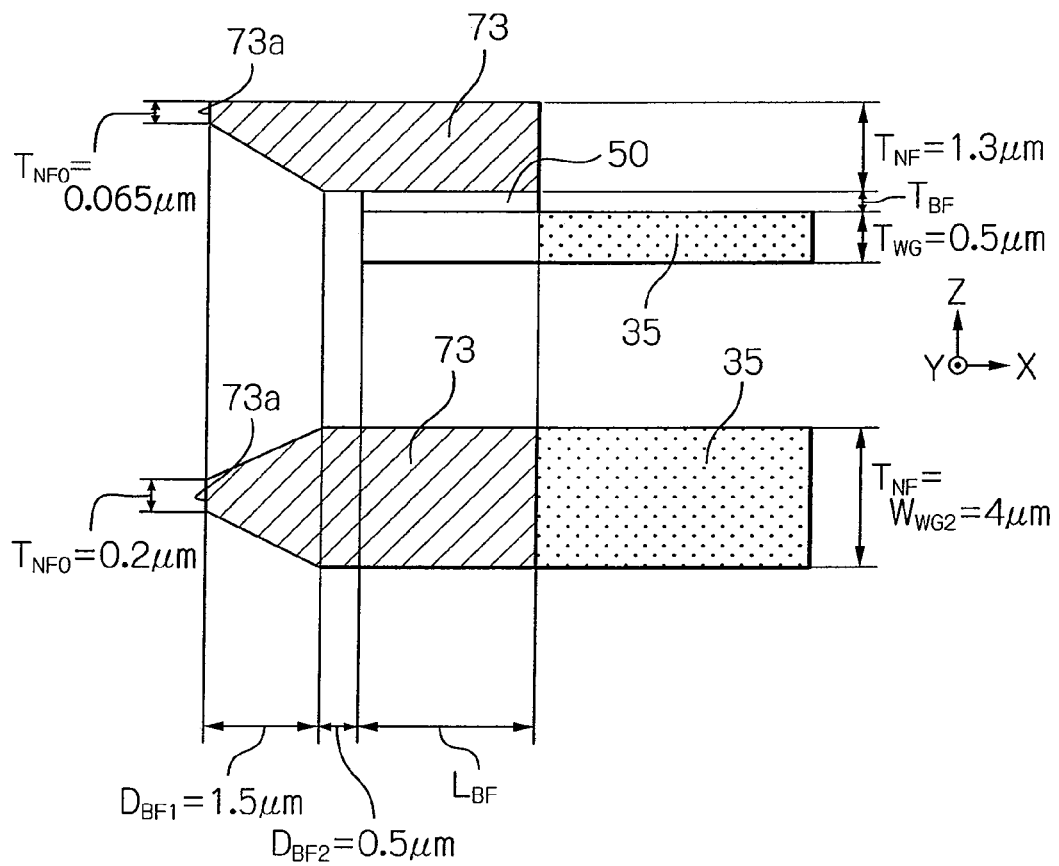

The waveguide 35 was formed of Si (refractive index n=3.5), having a width $W_{WG2}$ of 4 μm and a thickness $T_{WG}$ of 0.5 μm, as shown in FIG. 10c. The near-field light generating layer 73 was formed of Ag (in which the real part of the refractive index is 4, and an imaginary part is 11), having a width $W_{NF}$ of 4 μm, a width $W_{NFO}$ of 0.2 μm in the end 73a, a thickness $T_{NF}$ of 1.3 μm, and a thickness $T_{NFO}$ of 0.065 μm in the end 73a, also as shown in FIG. 10c. A distance $D_{BF1}$ from the head part end surface 2210 to a taper-beginning position of the near-field light generating layer 36 was 1.5 μm, and a distance $D_{NF2}$ from the taper-beginning position to the end on the head part end surface 2210 side of the waveguide 35 was 0.5 μm. Here, distance $D_{BF1}$+distance $D_{BF2}$=distance $D_{BF}$ (FIG. 4) is met. Further, the overcoat layer 38 was formed of $Al_2O_3$ (refractive index n=1.65), and the buffering portion 50 was a portion of the overcoat layer 38. That is, the refractive index $n_{BF}$ of the buffering portion 50 was 1.65.

The light use efficiency for near-field light in the head is given by $I_{OUT}/I_{IN}$ (×100), where $I_{IN}$ is the intensity of laser light 52 incident to the waveguide 35, and $I_{OUT}$ is the intensity of light radiated from an observation surface 2210a on the head part end surface 2210 after converting the laser light into surface plasmon in the near-field light generating layer 73. The intensity $I_{IN}$ of the incident laser light 52 was 632 $(V/m)^2$ in the experiments.

Figure 10D:
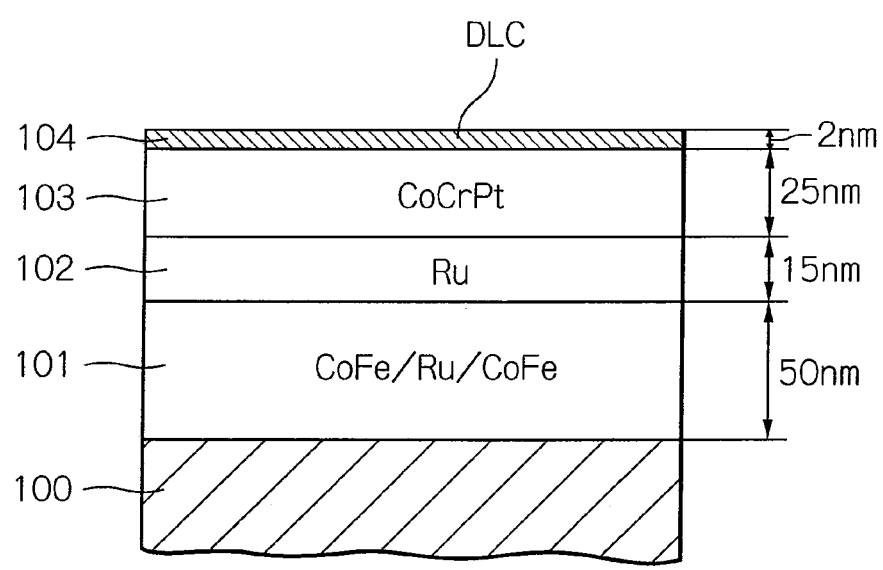

Further, a preferable lower limit value of the light use efficiency is defined as a value by which the temperature of a magnetic recording layer can be increased to 300° C. (degrees centigrade) or more that is a generally required temperature, and this lower limit value was decided based on simulation. As simulation conditions, a 3.5 inch magnetic disk 10 was used as a magnetic recording medium. The magnetic disk 10 was formed, as shown in FIG. 10d, by sequentially stacking on a disk substrate 100: an soft magnetic under layer 101 made of soft magnetic material of CoFe/Ru/CoFe with thickness of 50 nm; an undercoat layer 102 made of Ru with thickness of 15 nm; a perpendicular magnetization layer 103 as a magnetic recording layer made of CoCrPt with thickness of 25 nm; and an overcoat layer 104 made of DLC with thickness of 2 nm. The number of rotations of the magnetic disk 10 was 7200 rpm. The distance between the surface of the magnetic disk 10 and the end 73a of the near-field light generating layer 73 was 8 nm. The intensity of incident laser light was 18 mW. The end 73a for radiating near-field light has a width $W_{NFO}$ of 0.2 μm and a thickness $T_{NFO}$ of 0.065 μm, as described above. As a result of this simulation, it was found that the preferable lower limit value of the light use efficiency, by which the magnetic recording layer can be heated to 300° C., is 17.0%.

Under the experiment conditions described above, the light use efficiencies $I_{OUT}/I_{IN}$ (×100) were measured by simulation in the cases that the buffering portions 50 with various lengths $L_{BF}$ and thicknesses $T_{BF}$ were used.

Figure 11:
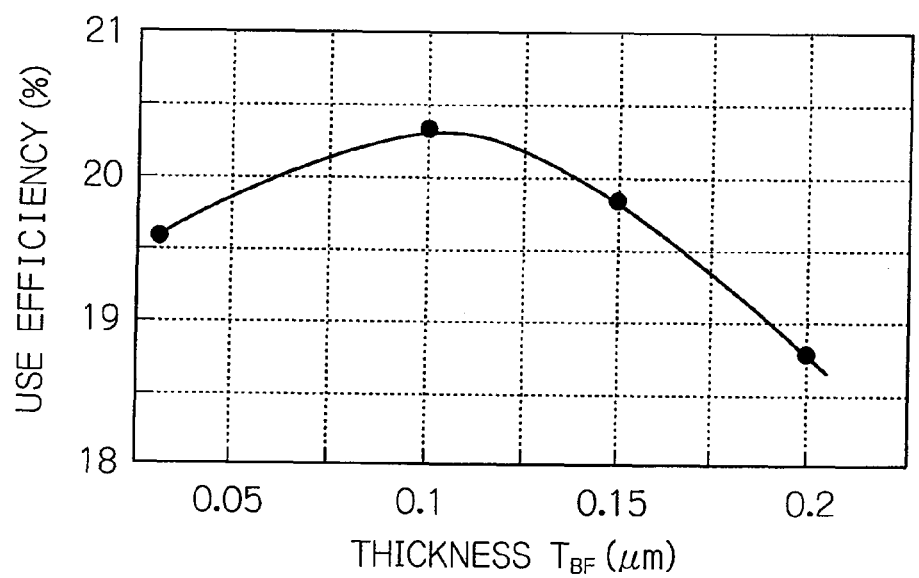
FIG. 11 shows a graph for the data shown in Table 1, illustrating the dependency of the light use efficiency $I_{OUT}/I_{IN}$ on the thickness $T_{BF}$ of the buffering portion.

Table 1 shows the relationship between the thickness $T_{BF}$ of the buffering portion 50 and the measured light use efficiency $I_{OUT}/I_{IN}$. And FIG. 11 shows a graph for the data shown in Table 1, illustrating the dependency of the light use efficiency $I_{OUT}/I_{IN}$ on the thickness $T_{BF}$ of the buffering portion 50.

TABLE 1

| | Thickness $T_{BF}$ (μm) | | | |
|---|---|---|---|---|
| | 0.03 | 0.1 | 0.15 | 0.2 |
| Light intensity $((V/m)^2)$ | 123.9 | 128.5 | 125.4 | 118.7 |
| Use efficiency $I_{OUT}/I_{IN}$ (%) | 19.6 | 20.3 | 19.8 | 18.8 |

In Table 1, the length $L_{BF}$ of the buffering portion 50 was 1.2 μm.

According to Table 1 and FIG. 11, it is understood that, in the range of the thicknesses $T_{BF}$ of the buffering portions 50 used in the experiment, any light use efficiency $I_{OUT}/I_{IN}$ presents a value exceeding 17.0% that is the preferable lower limit value described above, and thus, enough light intensity $I_{OUT}$ to heat the magnetic recording layer can be obtained.

Figure 12:
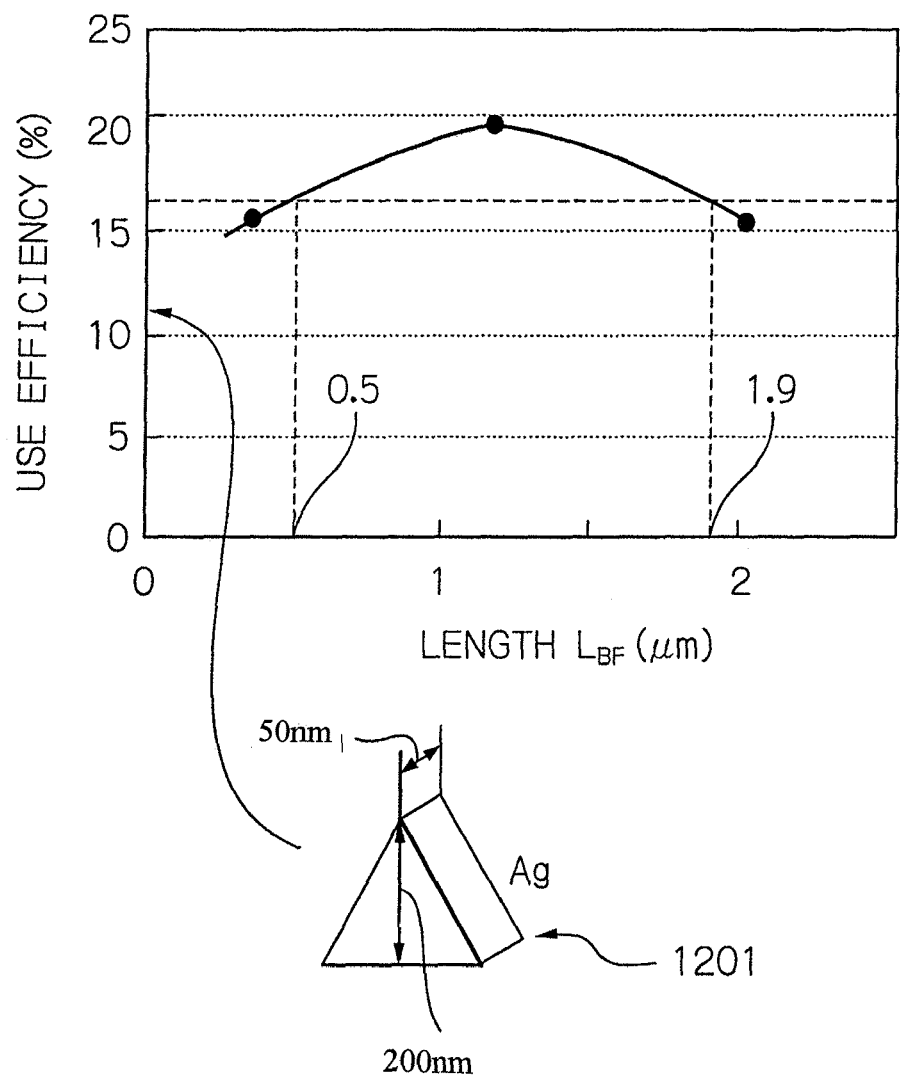
FIG. 12 shows a graph for the data shown in Table 2, illustrating the dependency of the light use efficiency $I_{OUT}/I_{IN}$ on the length $L_{BF}$ of the buffering portion.

Table 2 shows the relationship between the length $L_{BF}$ of the buffering portion 50 and the measured light use efficiency $I_{OUT}/I_{IN}$. And FIG. 12 shows a graph for the data shown in Table 2, illustrating the dependency of the light use efficiency $I_{OUT}/I_{IN}$ on the length $L_{BF}$ of the buffering portion 50.

TABLE 2

| | Length $L_{BF}$ (μm) | | |
|---|---|---|---|
| | 0.4 | 1.2 | 2.0 |
| Light intensity $((V/m)^2)$ | 99.1 | 125.4 | 98.0 |
| Use efficiency $I_{OUT}/I_{IN}$ (%) | 15.7 | 19.8 | 15.5 |

In Table 2, the thickness $T_{BF}$ of the buffering portion 50 was 0.15 μm.

According to Table 2 and FIG. 12, the light use efficiency $I_{OUT}/I_{IN}$ presents the maximum when the length $L_{BF}$ of the buffering portion 50 is around 1.2 μm, and its value is close to 20%. As shown in FIG. 12, it is understood that a range of the length $L_{BF}$ of the buffering portion 50, in which the light use efficiency becomes the same as or larger than the preferable lower limit value (17.0%) described above, is 0.5 μm≦$L_{BF}$≦1.9 μm, and this range is preferable.

Next, the result of the above-described practical examples will be compared with a case in which a conventional plasmon antenna is used. In the conventional case, the light use efficiency $I_{OUT}/I_{IN}$ of a plasmon antenna 1201 formed of Ag was measured with simulation, the plasmon antenna 1201 being an equilateral triangle flat plate with a height of 200 nm and a thickness of 50 nm. The intensity of incident laser light was also 632 $(V/m)^2$. When this plasmon antenna 1201 was used, the light use efficiency $I_{OUT}/I_{IN}$ was 11.0%. Therefore, it is understood that, even when any of the buffering portions 50 shown in FIG. 11 (Table 1) and FIG. 12 (Table 2) is used, greatly improved light use efficiency can be achieved compared with the conventional case.

Furthermore, when the buffering portion 50 had a thickness $T_{BF}$ of 0.15 μm and a length $L_{BF}$ of 1.2 μm (the light use efficiency $I_{OUT}/I_{IN}$: 9.8%), the temperature of the end 73a of the near-field light generating layer 73 during emitting near-field light was found to be about 120° C. This temperature is very small compared with the temperature of about 500° C. in the case of using conventional plasmon antennas.

As described above, it is understood that a heat-assisted magnetic recording head showing remarkably improved light use efficiency without excessive temperature rise of the near-field light generating layer can be achieved according to the present invention. Thus, the present invention can achieve better heat-assisted magnetic recording, and contribute to the achievement of higher recording density, for example, exceeding 1 Tbits/in$^2$.

All the foregoing embodiments are by way of example of the present invention only and not intended to be limiting, and many widely different alternations and modifications of the present invention may be constructed without departing from the spirit and scope of the present invention. Especially, the near-field light generating element utilizing the surface plasmon mode according to the present invention can be applied to optical devices with greatly minute optical paths such as ultra-high-speed light modulation devices. Accordingly, the present invention is limited only as defined in the following claims and equivalents thereto.

The invention claimed is:

1. A near-field light generating element comprising:
   a waveguide through which a light for generating near-field light propagates; and
   a near-field light generating layer comprising: a propagation surface on which surface plasmon excited by the light propagates; and a near-field light generating end at which near-field light is generated, said near-field light generating end being one end of said propagation surface,
   a portion of a side surface of said waveguide being opposed to a portion of said propagation surface of said near-field light generating layer with a predetermined spacing so that the light propagating through said waveguide is coupled with said near-field light generating layer in a surface plasmon mode.

2. The near-field light generating element as claimed in claim 1, wherein said near-field light generating layer is tapered toward said near-field light generating end.

3. The near-field light generating element as claimed in claim 1, wherein said near-field light generating layer is formed of one element selected from a group of Pd, Pt, Rh, Ir, Ru, Au, Ag, Cu or Al, or an alloy made of at least two selected from the group.

4. The near-field light generating element as claimed in claim 1, wherein said propagation surface is covered with a material having a refractive index higher than a refractive index of a material covering a surface opposite to said propagation surface of said near-field light generating layer.

5. The near-field light generating element as claimed in claim 1, wherein a portion sandwiched between the portion of the side surface of said waveguide and the portion of said propagation surface of said near-field light generating layer, which are opposed to each other, is a buffering portion having a refractive index lower than a refractive index of said waveguide.

6. The near-field light generating element as claimed in claim 5, wherein said buffering portion is a portion of an overcoat layer formed so as to cover said waveguide.

7. The near-field light generating element as claimed in claim 5, wherein a length of said buffering portion is in a range from 0.5 micrometer to 1.9 micrometer.

8. A heat-assisted magnetic recording head comprising:
   a magnetic pole for generating write field from its end on an opposed-to-medium surface side;
   a waveguide through which a light for generating near-field light propagates; and
   a near-field light generating layer comprising: a propagation surface on which surface plasmon excited by the light propagates; and a near-field light generating end at which near-field light is generated, said near-field light generating end being provided adjacent to an end of said magnetic pole and being one end of said propagation surface,
   a portion of a side surface of said waveguide being opposed to a portion of said propagation surface of said near-field light generating layer with a predetermined spacing so that the light propagating through said waveguide is coupled with said near-field light generating layer in a surface plasmon mode.

9. The heat-assisted magnetic recording head as claimed in claim 8, wherein said waveguide is provided in a side opposite to said magnetic pole in relation to said near-field light generating layer.

10. The heat-assisted magnetic recording head as claimed in claim 8, wherein an end portion on the opposed-to-medium surface side of said magnetic pole has a shape extending slantwise toward an end portion on the opposed-to-medium surface side of said near-field light generating layer.

11. The heat-assisted magnetic recording head as claimed in claim 8, wherein an end portion on the opposed-to-medium surface side of said near-field light generating layer has a shape extending slantwise toward an end portion on the opposed-to-medium surface side of said magnetic pole.

12. The heat-assisted magnetic recording head as claimed in claim 8, wherein said near-field light generating layer is tapered toward said near-field light generating end.

13. The heat-assisted magnetic recording head as claimed in claim 8, wherein at least a portion of said propagation surface is a planer or curved surface which inclines, relative to an element-formation surface of a substrate, toward an end portion on the opposed-to-medium surface side of said magnetic pole.

14. The heat-assisted magnetic recording head as claimed in claim 8, wherein said near-field light generating layer is formed of one element selected from a group of Pd, Pt, Rh, Ir, Ru, Au, Ag, Cu or Al, or an alloy made of at least two selected from the group.

15. The heat-assisted magnetic recording head as claimed in claim 8, wherein said propagation surface is covered with a material having a refractive index higher than a refractive index of a material covering a surface opposite to said propagation surface of said near-field light generating layer.

16. The heat-assisted magnetic recording head as claimed in claim 15, wherein a thermal conduction layer is provided between said near-field light generating layer and said magnetic pole, so as to cover the surface opposite to said propagation surface of said near-field light generating layer.

17. The near-field light generating element as claimed in claim 8, wherein a portion sandwiched between the portion of the side surface of said waveguide and the portion of said propagation surface of said near-field light generating layer, which are opposed to each other, is a buffering portion having a refractive index lower than a refractive index of said waveguide.

18. The heat-assisted magnetic recording head as claimed in claim 17, wherein an end on the opposed-to-medium surface side of said buffering portion is positioned apart from the opposed-to-medium surface by a predetermined distance.

19. The heat-assisted magnetic recording head as claimed in claim 17, wherein said buffering portion is a portion of an overcoat layer formed so as to cover said waveguide.

20. The heat-assisted magnetic recording head as claimed in claim 17, wherein a length of said buffering portion is in a range from 0.5 micrometer to 1.9 micrometer.

21. A head gimbal assembly comprising: a heat-assisted magnetic recording head as claimed in claim 8; and a suspension supporting said heat-assisted magnetic recording head.

22. A magnetic recording apparatus comprising:
- at least one head gimbal assembly comprising a heat-assisted magnetic recording head and a suspension supporting said heat-assisted magnetic recording head;
- at least one magnetic recording medium; and
- a recording circuit for controlling write operations which said heat-assisted magnetic recording head performs to said at least one magnetic recording medium, said heat-assisted magnetic recording head comprising:
- a magnetic pole for generating write field from its end on an opposed-to-medium surface side;
- a waveguide through which a light for generating near-field light propagates; and
- a near-field light generating layer comprising: a propagation surface on which surface plasmon excited by the light propagates; and a near-field light generating end at which near-field light is generated, said near-field light generating end being provided adjacent to an end of said magnetic pole and being one end of said propagation surface,
- a portion of a side surface of said waveguide being opposed to a portion of said propagation surface of said near-field light generating layer with a predetermined spacing so that the light propagating through said waveguide is coupled with said near-field light generating layer in a surface plasmon mode, and
- said recording circuit further comprising a light-emission control circuit for controlling operations of a light source that generates the light for generating near-field light.

23. The magnetic recording apparatus as claimed in claim 22, wherein said waveguide is provided in a side opposite to said magnetic pole in relation to said near-field light generating layer.

24. The magnetic recording apparatus as claimed in claim 22, wherein an end portion on the opposed-to-medium surface side of said magnetic pole has a shape extending slantwise toward an end portion on the opposed-to-medium surface side of said near-field light generating layer.

25. The magnetic recording apparatus as claimed in claim 22, wherein an end portion on the opposed-to-medium surface side of said near-field light generating layer has a shape extending slantwise toward an end portion on the opposed-to-medium surface side of said magnetic pole.

26. The magnetic recording apparatus as claimed in claim 22, wherein said near-field light generating layer is tapered toward said near-field light generating end.

27. The magnetic recording apparatus as claimed in claim 22, wherein at least a portion of said propagation surface is a planer or curved surface which inclines, relative to an element-formation surface of a substrate, toward an end portion on the opposed-to-medium surface side of said magnetic pole.

28. The magnetic recording apparatus as claimed in claim 22, wherein a portion sandwiched between the portion of the side surface of said waveguide and the portion of said propagation surface of said near-field light generating layer, which are opposed to each other, is a buffering portion having a refractive index lower than a refractive index of said waveguide.

29. The magnetic recording apparatus as claimed in claim 28, wherein an end on the opposed-to-medium surface side of said buffering portion is positioned apart from the opposed-to-medium surface by a predetermined distance.

30. A magnetic recording method comprising steps of:
- exciting surface plasmon in a near-field light generating layer by coupling a light propagating through a waveguide with said near-field light generating layer in a surface plasmon mode;
- generating near-field light in an end on an opposed-to-medium surface side of said near-field light generating layer by making the surface plasmon propagate toward the opposed-to-medium surface on a surface of said near-field light generating layer;
- making an anisotropic field of a portion of a magnetic recording medium lowered by irradiating said portion with the near-field light; and
- performing a write operation by applying write field generated from a magnetic pole to said portion with lowered anisotropic field of said magnetic recording medium.

31. The magnetic recording method as claimed in claim 30, wherein the surface plasmon propagates on a surface opposite to said magnetic pole in said near-field light generating layer.

32. The magnetic recording method as claimed in claim 30, wherein the light propagating through said waveguide is coupled with said near-field light generating layer in a position apart from the opposed-to-medium surface by a predetermined distance.

* * * * *